(12) United States Patent
Colombo

(10) Patent No.: US 12,468,638 B2
(45) Date of Patent: Nov. 11, 2025

(54) PROCESSING SYSTEM, RELATED INTEGRATED CIRCUIT, APPARATUS AND METHOD

(71) Applicant: STMicroelectronics International N.V., Geneva (CH)

(72) Inventor: Roberto Colombo, Munich (DE)

(73) Assignee: STMicroelectronics International N.V., Geneva (CH)

( * ) Notice: Subject to any disclaimer, the term of this patent is extended or adjusted under 35 U.S.C. 154(b) by 93 days.

(21) Appl. No.: 18/615,166

(22) Filed: Mar. 25, 2024

(65) Prior Publication Data
US 2024/0403230 A1  Dec. 5, 2024

(30) Foreign Application Priority Data

May 29, 2023 (IT) .......................... 102023000010785

(51) Int. Cl.
*G06F 12/14* (2006.01)
*G06F 9/455* (2018.01)

(52) U.S. Cl.
CPC ...... *G06F 12/1441* (2013.01); *G06F 9/45558* (2013.01); *G06F 12/1408* (2013.01); *G06F 2009/45587* (2013.01)

(58) Field of Classification Search
CPC ............. G06F 12/1441; G06F 9/45558; G06F 12/1408; G06F 2009/45587
See application file for complete search history.

(56) References Cited

U.S. PATENT DOCUMENTS

| | | | |
|---|---|---|---|
| 11,321,492 B2 | 5/2022 | Colombo et al. | |
| 11,537,421 B1* | 12/2022 | Brooker | H04L 9/0894 |
| 2012/0117614 A1 | 5/2012 | Sahita et al. | |
| 2015/0248357 A1* | 9/2015 | Kaplan | G06F 12/1408 |
| | | | 713/193 |
| 2019/0004843 A1* | 1/2019 | Durham | G06F 21/53 |
| 2019/0042302 A1 | 2/2019 | Goeringer et al. | |
| 2022/0357973 A1 | 11/2022 | Vittorelli et al. | |

FOREIGN PATENT DOCUMENTS

| | | |
|---|---|---|
| EP | 3425552 A1 | 1/2019 |
| EP | 4086763 A1 | 11/2022 |

* cited by examiner

*Primary Examiner* — Mohamed A. Wasel
(74) *Attorney, Agent, or Firm* — Slater Matsil LLP

(57) ABSTRACT

A processing system includes a hardware address protection for limiting access to communication system addresses based on a virtual machine ID (VMID), a plurality of processing cores, a volatile memory, a hardware secure module (HSM), and a further communication system connecting the HSM to the communication system. A slave interface circuit of the further communication system receives a write request from the communication system and transmits the VMID in the write request to the HSM. The HSM accesses virtual machine configuration data to determine address data indicating positions of first and second memory areas in the volatile memory, and sends, via a master interface circuit, read/write requests, including the VMID, to the communication system to read command data from the first memory area and write response data to the second memory area. The HSM then stores a response notification to a register of the further communication system.

20 Claims, 8 Drawing Sheets

| IRQ1 | VMID | MA | BA |
|---|---|---|---|
| IRQ1$_1$ | VMID$_1$ | MA$_1$ | BA$_1$ |
| IRQ1$_2$ | VMID$_2$ | MA$_2$ | BA$_2$ |
| - | - | - | - |
| - | - | - | - |
| - | - | - | - |

VMCD

PROCESSING SYSTEM, RELATED INTEGRATED CIRCUIT, APPARATUS AND METHOD

CROSS-REFERENCE TO RELATED APPLICATIONS

This application claims the priority benefit of Italian patent application number 102023000010785, filed on May 29, 2023, entitled "A processing system, related integrated circuit, device and method," which is hereby incorporated herein by reference to the maximum extent allowable by law.

TECHNICAL FIELD

Embodiments of the present disclosure relate to processing methods and systems comprising a Hardware Secure Module (HSM), in particular multi-core processing methods and systems configured to execute virtual machines.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a micro-controller (e.g., dedicated to the automotive market).

For example, in FIG. 1 are shown three processing systems $10_1$, $10_2$ and $10_3$ connected through a suitable communication system 15. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Anti-lock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, such as a micro-controller, which may be used as any of the processing systems 10 of FIG. 1.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of:

- one or more communication interfaces IF, e.g., for exchanging data via the additional communication system 15, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or
- one or more analog-to-digital converters AD and/or digital-to-analog converters DA; and/or
- one or more dedicated digital components DC, such as hardware timers and/or counters, or a cryptographic co-processor; and/or
- one or more analog components AC, such as comparators, sensors, such as a temperature sensor, etc.; and/or
- one or more mixed signal components MSC, such as a PWM (Pulse-Width Modulation) driver.

Generally, a dedicated digital components DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

In this respect, future generation of such processing systems 10, e.g., micro-controllers adapted to be used in automotive applications, are expected to exhibit an increase in complexity, mainly due to the increasing number of requested functionalities (new protocols, new features, etc.) and to the tight constraints of execution conditions (e.g., lower power consumption, increased calculation power and speed, etc.). In parallel to the growth in complexity, it is also requested a great flexibility in the micro-controller configuration in order to fit into one single product applications that were formerly allocated on separate processing systems 10.

For example, recently more complex multi-core processing systems 10 have been proposed. For example, such multi-core processing systems may be used to execute (in parallel) several of the processing systems 10 shown in FIG. 1, such as several ECUs of an apparatus such as a vehicle.

FIG. 3 shows an example of a multi-core processing system 10. Specifically, in the example considered, the processing system 10 comprises a plurality of n processing cores $102_1 \ldots 102_n$ connected to a (on-chip) communication system 114. For example, in the context of real-time control systems, the processing cores $102_1 \ldots 102_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core 1021, each processing core 102 may comprise a microprocessor 1020 and a communication interface 1022 configured to manage the communication between the microprocessor 1020 and the communication system 114. Typically, the interface 1022 is a master interface configured to forward a given (read or write) request from the microprocessor 1020 to the communication system 114, and forward an optional response from the communication system 114 to the microprocessor 1020. However, the communication interface 1022 may also comprise a slave interface. For example, in this way, a first microprocessor 1020 may send a request to a second microprocessor 1020 (via the communication interface 1022 of the first microprocessor, the communication system 114 and the communication interface 1022 of the second microprocessor).

Generally, each processing core $102_1 \ldots 102_n$ may also comprise further local resources, such as one or more local memories 1026, usually identified as Tightly Coupled Memory (TCM).

As mentioned before, typically the processing cores $102_1 \ldots 102_n$ are arranged to exchange data with a non-volatile memory 104 and/or a volatile memory 104b. In a multi-core processing system 10, often these memories are system memories, i.e., shared for the processing cores $102_1 \ldots 102_n$. As mentioned before, each processing core $102_1 \ldots 102_n$ may, however, comprise one or more additional local memories 1026.

For example, as shown in FIG. 3, the processing system 10 may comprise one or more memory controllers 100 configured to connect at least one non-volatile memory 104 and at least one volatile memory 104b to the communication system 114. As mentioned before, one or more of the memories 104 and/or 104b may be integrated in the integrated circuit of the processing system 10 or connected externally to the integrated circuit. For example, the processing system 10 may comprise:

- a first volatile memory 104b integrated in the integrated circuit of the processing system 10 and connected to the communication system 114 via a first memory controller 100, and
- a second volatile memory 104b external with respect to the integrated circuit of the processing system 10 and connected to the communication system 114 via a second memory controller 100.

As mentioned before, the processing system 10 may comprise one or more resources 106, such as one or more communication interfaces or co-processors (e.g., a cryptographic co-processor). The resources 106 are usually connected to the communication system 114 via a respective communication interface 1062, such as a peripheral bridge. For example, for this purpose, the communication system 114 may indeed comprise an Advanced Microcontroller Bus Architecture (AMBA) High-performance Bus (AHB), and an Advanced Peripheral Bus (APB) used to connect the resources/peripherals 106 to the AMBA AHB bus. In general, the communication interface 1062 comprises at least a slave interface. For example, in this way, a processing core 102 may send a request to a resource 106 and the resource returns given data. Generally, one or more of the communication interfaces 1062 may also comprise a respective master interface. For example, such a master interface, often identified as integrated Direct Memory Access (DMA) controller, may be useful in case the resource has to start a communication in order to exchange data via (read and/or write) request with another circuit connected to the communication system 114, such as a resource 106 or a processing core 102.

Often such processing systems 10 comprise also one or more general-purpose DMA controllers 110. For example, as shown in FIG. 3, a DMA controller 110 may be used to directly exchange data with a memory, e.g., the memory 104b, based on requests received from a resource 106. For example, in this way, a communication interface may directly read data (via the DMA controller 110) from the memory 104b and transmit these data, without having to exchange further data with a processing unit 102. Generally, a DMA controller 110 may communicate with the memory or memories via the communication system 114 or via one or more dedicated communication channels.

Accordingly, from a hardware point of view, the processing system 10 shown in FIG. 3 comprises a plurality of processing cores 102 and other circuits, such as the resources 106 and the memory controller 100, connected to a communication system 114.

In this respect, the processing system 10 may execute several software tasks, e.g., by executing in sequence software tasks on the same processing core 102 and/or in parallel on a plurality of processing cores 102. However, such tasks may execute rather different operations. Accordingly, from a safety and/or security point of view, often each software task should have only given access rights.

For example, in many processing systems 10, this problem is solved by using a software and/or hardware address range protection.

For example, as shown in FIG. 4, often such address range protections are implemented by separating the software tasks into tasks of an operating system OS and tasks of applications APP executed by the operating system OS.

Substantially, an operating system OS initializes a given application APP and then switches to an application task, which keeps running until a certain time has elapsed, or because an asynchronous event, such as an interrupt or exception, has occurred. Next, the operating system OS takes back the control and, e.g., switches to another software task.

In this case, the operating system OS may manage a (e.g., virtual) address range for each application APP. Specifically, in a software protection mechanism, all read and write requests of an application APP have to pass through the operating system OS, which thus may determine whether a given request belongs to the (virtual) address range associated to the application.

Conversely, in a hardware address protection, the (e.g., virtual) address ranges are directly communicated to the hardware layer, which thus may determine whether a given software task may access a given physical address. Typically, the operating system OS is executed at privilege level, whereas an application task (or process) APP runs at user/application level.

For example, in an ARM AArch64 architecture, the operating system OS may configure a plurality of virtual address ranges, which are identified via an Address Space identification (ID) (ASID). For example, in this way, the operating system OS may, e.g.:

- configure a single virtual address range for the applications APP, wherein this address range is separated from the address range used by the operating system OS; or
- configure for each application APP a respective virtual address range.

Substantially, in case the operating systems OS configures a plurality of virtual address ranges, the operating system OS sets the respective ASID when switching between the applications. For example, in this way, the applications APP may be developed separately from the operating systems OS. For example, each application development team may have associated a respective application address range.

For example, in the ARM AArch64 architecture are used so called translation tables (TTB) for this purpose. Specifically, a translation table permits to map a given virtual address to a respective physical address or a further virtual address. For example, in the ARM AArch64 architecture, two translation tables may be specified:

a first translation table, which maps given virtual address ranges of the operating system OS to physical addresses; and a second table, which maps one or more virtual application addresses to virtual addresses of the operating system.

Accordingly, a virtual application address may first be mapped to a virtual operating system address and then to a respective physical address. For example, in an ARM AArch64 architecture, typically the OS translation table is implemented in the exception level EL1 and the application translation table is implemented in the exception level EL0.

Specifically, in the ARM AArch64 architecture, this mapping of virtual addresses (VA) to physical addresses (PA) of the communication system 114 is implemented directly within a Memory Management Unit (MMU) of the processing core 102. Since the physical address ranges of the communication system 114 are associated with memory ranges in the memories 104 and/or 104b, and the resources 106, it is thus possible to limit the read and write access rights of a given application APP or the operating system OS to given memory ranges and/or resources 106.

Accordingly, the ARM AArch64 architecture is based on a Virtual Memory System Architecture (VMSA). Conversely, the ARM AArch32 typically uses a Protected Memory System Architecture (PMSA) rather than a VMSA. Specifically, in case of AArch32 with PMSA, which is usually the case for Cortex®-R52 processors, the processing system 10 does not perform an address translation.

For example, in this case, the operating OS, usually a real-time operating system (RTOS), such as OSEK ("*Offene Systeme und deren Schnittstellen für die Elektronik in Kraftfahrzeugen*") or Autosar-OS, may be configured to define a number of statically assigned regions to task groups using directly physical addresses. As mentioned before, in an AArch32 PMSA architecture, the processing system 10 does not comprise a Memory Management Unit (MMU), which performs a virtual address translation. Conversely, in this case, the processing system 10 comprises a Memory Protection Unit (MPU). Specifically, instead of defining the mapping of virtual addresses to physical addresses, the MPU permits to specify, e.g., via a table, one or more memory regions in the physical address space and permits to specify the respective access rights and memory attributes. For example, this access-right table of the OS and the applications APP may be implemented in the exception level EL1.

FIG. 5 shows moreover that recently it has been proposed to perform a virtualization, wherein a hypervisor HYP is executed by the processing system 10. Specifically, the hypervisor HYP essentially corresponds to a particular operating system, which permits to configure a plurality of m virtual machines VM1 . . . VMm, wherein each virtual machine VM may execute respective software tasks, such as a respective operating system OS and one or more respective applications APP.

Those of skill in the art will appreciate that the virtualization can be either physical or logical. A physical virtualization exists when multiple microprocessors 1020 are statically assigned to different virtual machines. In this case, each virtual machine is associated with one or more microprocessors 1020 and executes respective software tasks (e.g., operating system and application tasks). A physical virtualization implies that the virtual machines run in parallel, because each virtual machine uses different microprocessors 1020. Conversely, a logical virtualization exists when a microprocessor 1020 is not statically assigned to one single virtual machine, but rather multiple virtual machines are run one the same microprocessors 1020. A logical virtualization implies that each virtual machine runs in time-sharing, and the hypervisor HYP is configured to activate and de-activate each virtual machine VM, one at a time, according to a given policies. In general, also mixed situation may exists, wherein one or more microprocessors 1020 implement a physical virtualization and further one or more microprocessors 1020 implement a logic virtualization.

Thus, when using an VMSA architecture, each virtual machine VM1 . . . VMm may have associated a respective virtual address range, so called Intermediate Physical Addresses (IPA). For example, in the ARM AArch64 architecture, typically the virtual machine translation table is implemented in the exception level EL2. For example, in the ARM AArch64 architecture, the value Virtual Machine ID (VMID) identifies the number of a given ID. This value is required, because a given processing core 102 is not necessarily associated univocally to given respective virtual machine. As mentioned before, a plurality of virtual machines may be executed (via a time scheduling scheme) on the same processing core 102 or a given virtual machine may be executed (in parallel or sequentially) by a plurality of processing cores 102. Substantially, the hypervisor HYP sets the respective VMID of a given processing core 102 when switching from one virtual machine to another.

Similarly, when using a PMSA architecture, each virtual machine VM1 . . . VMm may have associated a respective physical address range. For example, in the ARM AArch32 PMSA architecture, typically the virtual machine access-right table is implemented in the exception level EL2. Typically, the respective access-right table in the exception level EL2 is again identified via a VMID, which is set by the hypervisor HYP for each processing core 102. Thus, also in the ARM AArch32 PMSA architecture, the memory space is covered by a 2-level protection, one controlled in exception level EL2 by the hypervisor HYP setting the address range boundaries of the virtual machines VM, and an underlying exception level EL1 under control of the operating systems OS setting the access rights of each task. Evidently, this implies that each software task (OS or APP) has to know a-priori the physical addresses, e.g., of the various resources 106, it may access.

FIG. 6 shows in this respect a possible mapping of the translation tables in an ARM AArch64 architecture with a hypervisor HYP.

Specifically, considering that the physical address range includes addresses associated with the various circuits of the processing system 10 connected to the communication system 114, such as memories 104 and 104b, the resources 106, the DMA controller 110 and the processing cores 102, a given request transmitted to the communication system 114 has to indicate a physical address PA. As mentioned before, in an ARM AArch64 architecture, these physical addresses PA may be mapped via translation tables to virtual addresses via an MMU of each processing core 102, i.e., the tables are configured within the MMU of the processing cores 102. For example, this may imply that the hypervisor HYP has to reconfigure these tables when switching between different virtual machines VM.

For example, in FIG. 6 are used the following translation tables:
- a table TTBR_EL2 for mapping a virtual address range of the hypervisor HYP to a physical address PA;
- for each virtual machine VM (or at least for the virtual machine VM currently executed by a given processing core 102) a table VTTBR_EL2 for mapping an intermediate physical address IPA of the respective virtual machine VM to a physical address range PA;
- for the operating system OS executed by a given virtual machine VM, a table TTBR_EL1 for mapping a virtual operating system address VA_OS to an intermediate physical address range IPA; and
- one or more tables TBR_EL0 for defining for a given operating system OS respective application address ranges for mapping a virtual application address VA_APP to a virtual operating system address VA_OS.

Generally, the table TTBR_EL2 is purely optional, because in case of a trusted hypervisor HYP, the hypervisor may also have access to the complete address space, e.g., by sending privileged requests at the exception level EL2. Similarly, the table TTBR_EL1 is purely optional and the address range VA_OS may correspond to the intermediate address range IPA.

Conversely, in an ARM AArch32 PMSA architecture, the translation tables, such as VTTBR_EL2, TTBR_EL2 and TTBR_EL1, would be replaces with tables directly specifying the access-rights to given physical address ranges. In fact, in this case, a processing core 102 would directly provide a physical address (rather than a virtual address as in the VMSA architecture) and the MPU of the processing core 102 is configured to verify whether the request of the processing core 102 may be executed based on the access-rights specified for the VMID and optionally ASID provided by the processing core 102.

Thus, the translation tables in a VMSA (such as the ARM AArch64 VMSA) architecture or the access-rights tables in a PMSA (such as the ARM AArch32 PMSA) architecture, when managed in a suitable manner via the hypervisor HYP and optionally the operating system OS, provides an efficient solution for separating the access rights of one virtual machine VM (and optionally the applications APP executed by the virtual machine) from the access rights of another virtual machine VM. For example, in this way, one or more dedicated physical address ranges PA may be associated with each virtual machine VM and optionally with the hypervisor HYP.

Accordingly, an MMU or MPU implements an address filtering/protection operation before the respective request is forwarded to the communication system 114. Conversely, United States Patent Application US 2022/0357973 A1, whose content is incorporated herein by reference for this purpose, discloses also a solution wherein similar access rights may be configured by including the VMID and optionally ASID in the requests sent by master interfaces, such as the interface 1022 of a microprocessor 1020, and the receiving slave interface, e.g., the interface 1062 of a resource 106 or the memory controller 100, determines whether the received VMID and optional ASID may access the indicated physical address.

For example, by using such address protections based on the data VMID and optional ASID, access to the resources 106 may be managed. For example, assuming a processing system 10 running two virtual machines VM, which have to communicate via a SPI bus, the hypervisor HYP may configure the access-rights in order to:
- in case the processing system 10 comprises at least two SPI interfaces 106, assign the address range associated with the first SPI interface to a first virtual machine VM and the address range associated with the second SPI interface to a second virtual machine VM; or
- in case the processing system 10 comprises one SPI interface 106, assign the address range associated with the SPI interface to the hypervisor HYP, which then may manage two virtual (software) SPI interfaces.

Accordingly, the hypervisor HYP may configure the processing system 10 in order to ensure that one or more resources (and/or memory address ranges) may be accessed only via the hypervisor HYP. As indicated before, this situation usually occurs for shared resources 106 being used by plural virtual machines, and which cannot be associate to a specific virtual machine. For example, such shared resources managed by the hypervisor HYP may be system resources, such as a reset management circuit configured to manage the reset generation within the processing system and/or an error management and fault collection circuit. Other shared resources 106 may comprise a communication interface, a cryptographic coprocessor and/or a more complex Hardware Secure Module (HSM).

Specifically, an HSM is a security element often embedded in microcontrollers when security plays an important role in the application executed by the microcontroller, e.g., in case of microcontrollers for automotive applications. Typically, the HSM comprises a control circuit, e.g., implemented with a further microprocessor, and a cryptographic co-processor. Typically, the HSM comprises also one or more memories, such as a non-volatile memory for storing one or more cryptographic keys (and the firmware of the microprocessor), and a volatile memory, such as a RAM, for storing temporary processing results. Typically, the HSM comprises also one or more communication interfaces for receiving commands. Specifically, the HSM offers usually a set of cryptographic services (for example encryption, decryption, authentication, etc.) upon requests received via the one or more communication interfaces, e.g., from a microprocessor 1020 of the processing system 10. The main characteristic of the HSM is that it is a fully isolated module, which means that other circuits of the processing system cannot access the internal resources of the HSM, but can send only commands to the HSM via the one or more communication interfaces. For example, such hardware secure modules are disclosed in U.S. Pat. No. 11,321,492 B2 and European Patent Application EP 3 425 552 A1, which are incorporated herein by reference for this purpose.

SUMMARY

In view of the above, it is an objective of various embodiments of the present disclosure to provide improved solutions for multi-core processing systems comprising a hardware secure module.

According to one or more embodiments, one or more of the above objectives is achieved by means of a processing system having the features specifically set forth in the claims that follow. Embodiments moreover concern a related integrated circuit, device, apparatus, and method.

The claims are an integral part of the technical teaching of the disclosure provided herein.

As mentioned before, various embodiments of the present disclosure relate to a processing system. The processing system comprises a communication system having a given physical address range, wherein the processing system comprises a hardware address protection in order to limit access to addresses in the physical address range as a function of a Virtual Machine ID (VMID). In general, the hardware address protection may filter the requests before the requests are transmitted by a master communication interface to the communication system, within the communication system, after the requests have been received by a slave communication interface, or a combination thereof.

The processing system comprises also a plurality of processing cores. In various embodiments, each processing core comprises a respective microprocessor configured to execute software instructions, a respective register configured to store a VMID, and a respective master interface circuit configured to forward read or write requests from the respective microprocessor to the communication system, wherein the read or write requests comprise a physical address of the physical address range and the VMID stored to the register. The processing system comprises also a volatile memory connected to the communication system, a Hardware Secure Module (HSM) configured to execute cryptographic service requests and a further communication system connecting the HSM to the communication system.

In various embodiments, the further communication system comprises a first communication channel and a second communication channel. Specifically, in various embodiments, the first communication channel comprising a slave interface circuit connected to the communication system and configured to receive a write request from the communication system. In response to determining that the received write request comprises a command notification, the slave interface transmits the VMID included in the received write request or a further VMID determined as a function of the VMID included in the received write request to the HSM. Accordingly, in response to receiving a VMID from the first communication channel, the HSM may execute the request.

For example, in order to transmit the VMID, the first communication channel may comprise two registers. In response to determining that the received write request comprises a command notification, the slave interface may store the VMID included in the received write request or the further VMID determined as a function of the VMID included in the received write request to the first register, and then transmit at least in part the content of the first register to the second register. Accordingly, the HSM may receive the VMID from the first communication channel by reading the content of the second register of the first communication channel.

In various embodiments, the first communication channel comprises a scheduling circuit configured to receive a sequence of a plurality of write requests from the communication system. Accordingly, the scheduling circuit may determine for each write request a respective VMID included in the respective write request or a respective further VMID determined as a function of the VMID included in the respective received write request, select one VMID or further VMID according to a given scheduling scheme, and transmit the selected VMID or further VMID to the HSM. For example, the scheduling circuit may be implemented with a FIFO memory.

In various embodiments, the first communication channel comprises a matching circuit configured to generate a plurality of interrupt signals based on the received VMID. For example, for this purpose, the matching circuit may access virtual machine configuration data, wherein the virtual machine configuration data are adapted to store for each interrupt signal a respective VMID. Accordingly, in response to determining that the VMID stored for an interrupt signal corresponds to the received VMID, the matching circuit may assert the respective interrupt signal. Accordingly, in this case, the HSM may determine the reception of a command notification based on the interrupt asserted by the matching circuit of the first communication channel. For example, each interrupt signal generated by the matching circuit of the first communication channel may be provided to a one or more microprocessors of the HSM, and may be used to trigger a different software routine.

In various embodiments, in response to receiving a VMID from the first communication channel, the HSM accesses virtual machine configuration data in order to determine address data as a function of the received VMID, wherein the address data indicate the position of a first memory area in the volatile memory adapted to store command data comprising a cryptographic service request and a second memory area in the volatile memory adapted to store response data of a cryptographic service request. Accordingly, the HSM may process the command data stored to the first memory area, thereby generating response data stored to the second memory area. Specifically, for this purpose, in various embodiments, the HSM sends via a master interface circuit of the HSM read requests to the communication system in order to read the command data from the first memory area, wherein the read requests comprise the received VMID, and sends via the master interface circuit of the HSM write requests to the communication system in order to write the response data to the second memory area, wherein the write requests comprise the received VMID.

In various embodiments, the second communication channel comprising a register for storing a response notification. Accordingly, once having processed the command data, the HSM may store a response notification to the register of the second communication channel. For example, for this purpose, the second communication channel may comprise two registers, wherein the HSM is configured to store the response notification to the first register of the second communication channel, and the second communication channel is configured to transmit at least in part the content of the first register to the second register.

In various embodiments, the response notification stored to the second register comprises the VMID included in the (initially) received write request. In this case, the second communication channel may comprise a matching circuit configured to generate a plurality of interrupt signals. For this purpose, the matching circuit may access matching data, wherein the matching data are adapted to store for each interrupt signal a respective VMID. Accordingly, in response to determining that the VMID stored for an interrupt signal corresponds to the VMID stored to the register of the second communication channel, the matching circuit may assert the respective interrupt signal. For example, each interrupt signal generated by the matching circuit of the second communication channel may be provided to a respective microprocessor.

Accordingly, in various embodiments, the HSM uses the received VMID in order to determine the first and second memory areas used to exchange the command and response data based on the virtual machine configuration data. For example, the address data of the virtual machine configuration data may comprise a first address indicate the position of a first memory area in the volatile memory adapted to store command data comprising a cryptographic service request and a second address indicating a second memory area in the volatile memory adapted to store response data of a cryptographic service request. For example, the HSM may obtain the virtual machine configuration data by reading the virtual machine configuration data from a non-volatile memory of the processing system 10a, reading the virtual machine configuration data from the volatile memory, and/or receiving the virtual machine configuration data via the slave interface circuit of the first communication channel.

Moreover, the HSM uses the received VMID in order to access the first and second memory areas by using the same VMID as the virtual machine having sent the respective command notification (or a derived version thereof), thereby permitting a configuration of the access rights which are enforced for the requests sent by the HSM.

For example, such a solution is particularly useful in case the microprocessors of the processing system are configured to execute a hypervisor, and a first and a second virtual machine. Specifically, in this case, the hypervisor may configure the hardware address protection in order to configure for each of the first and the second virtual machines a respective private virtual machine memory area in the volatile memory, wherein each virtual machine memory area comprises a respective first memory area adapted to store command data comprising a cryptographic service request and a respective second memory area adapted to store response data of a cryptographic service request. Moreover, the hypervisor may configure the hardware address protection in order to permit that the first and the second virtual machines may send write requests comprising a command notification to the slave interface circuit of the first communication channel. Next, the hypervisor may store a first VMID associated with the first virtual machine to the first register of a first processing core of the plurality of processing cores, and start the first virtual machine on the microprocessor of the first processing core. Similarly, the hypervisor may store a second VMID associated with the second virtual machine to the first register of a second processing core of the plurality of processing cores, and start the second virtual machine on the microprocessor of the second processing core.

Conversely, each virtual machine may be configured to store command data comprising a cryptographic service request to the respective first memory area and send a write request comprising a command notification to the slave interface circuit of the first communication channel.

Accordingly, the slave interface may determine the VMID transmitted with the write requests and communicate the VMID or a derived version thereof to the HSM, and the HSM may use the received VMID in order to determine the first and second memory areas and to read the command data from the first memory area and store the response data to the second memory area. Moreover, once have processed the command data, the HSM stores the response notification to the register of the second communication channel.

Accordingly, in response to determining that the HSM stores a response notification to the register of the second communication channel, the virtual machine having sent the command notification may access the respective second memory area for reading the response data.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
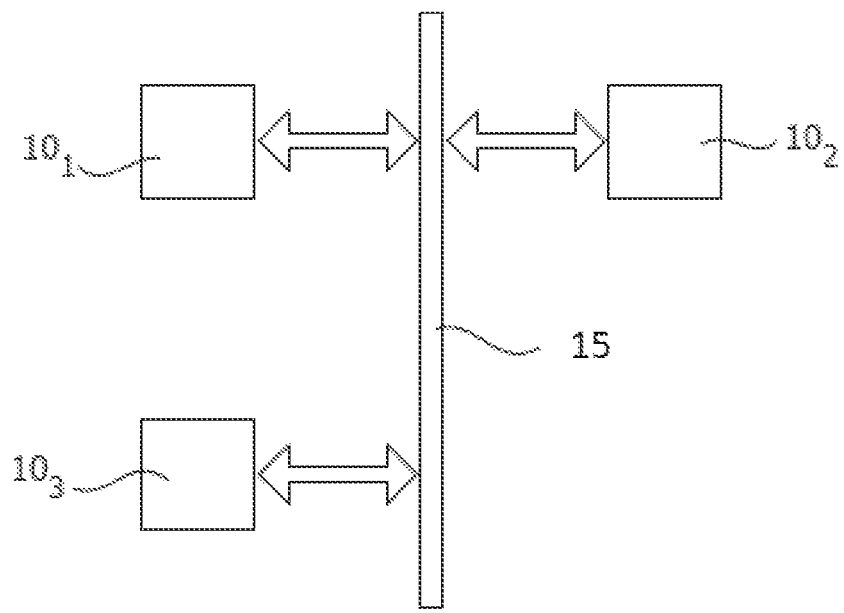
FIG. 1 shows an example of an electronic system comprising a plurality of processing systems.
Figure 6:
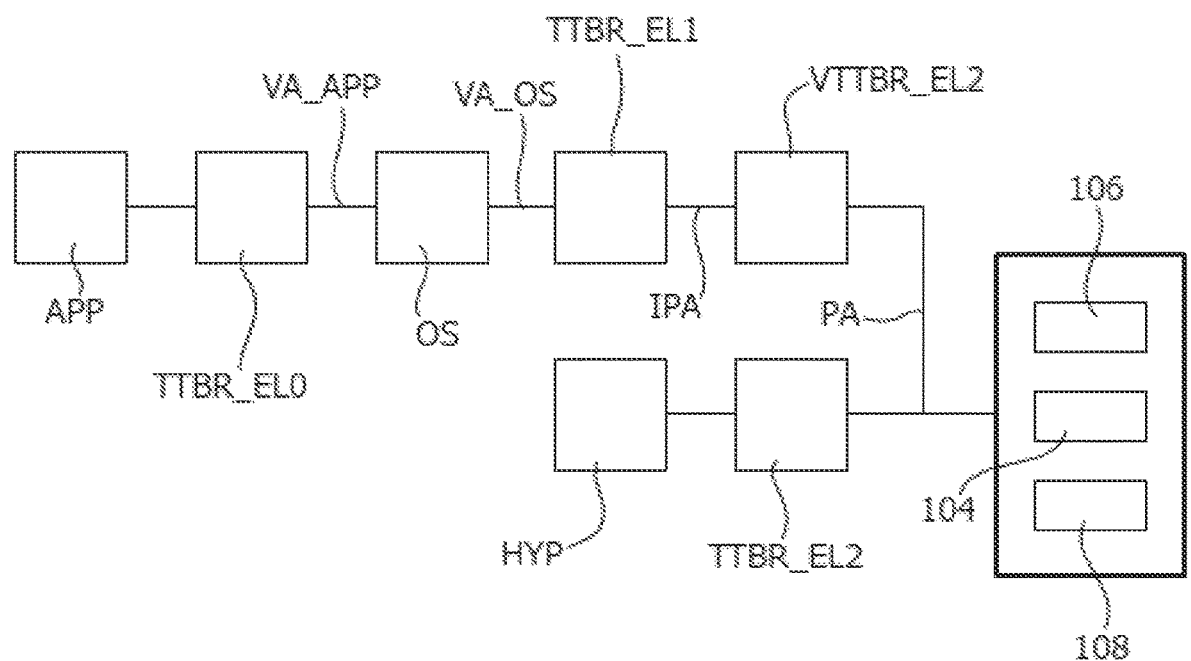
FIG. 6 shows an example of the configuration of translation tables used to configure virtual addresses of the virtual machines of FIG. 5.

In the following FIGS. 7 to 13 parts, elements or components which have already been described with reference to FIGS. 1 and 6 are denoted by the same references previously used in such Figures; the description of such previously described elements will not be repeated in the following in order not to overburden the present detailed description.

As mentioned before, various embodiments of the present disclosure relate to solutions for multi-core processing systems comprising a Hardware Secure Module. In general, while such multi-core processing systems may be used for microcontrollers dedicated to the automotive market, the solutions disclosed herein may also be used in other multi-core processing systems.

Figure 7:
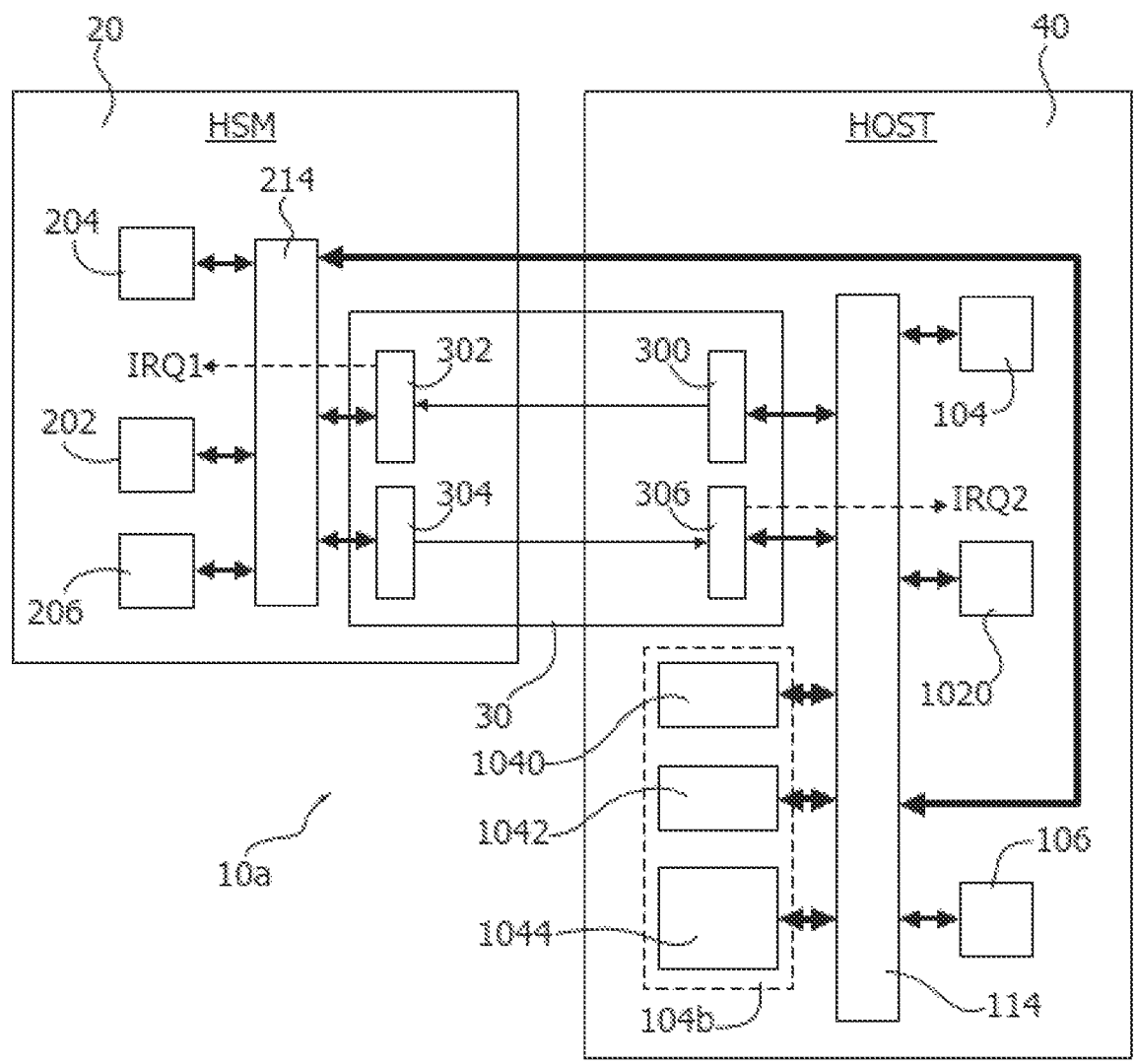
FIG. 7 shows a first embodiment of a multi-core processing system comprising a hardware secure module.

FIG. 7 shows an embodiment of a processing system 10a comprising a Hardware Secure Module (HSM) 20.

As mentioned before, when using a processing system comprising an HSM, the processing system comprises two sub-systems: an HSM sub-system 20, indicated in the following also just as HSM, which comprises the circuits of the Hardware Secure Module, and a host sub-system 40, indicated in the following also just as HOST, comprising the remaining circuits of the processing system 10*a*.

Figure 2:
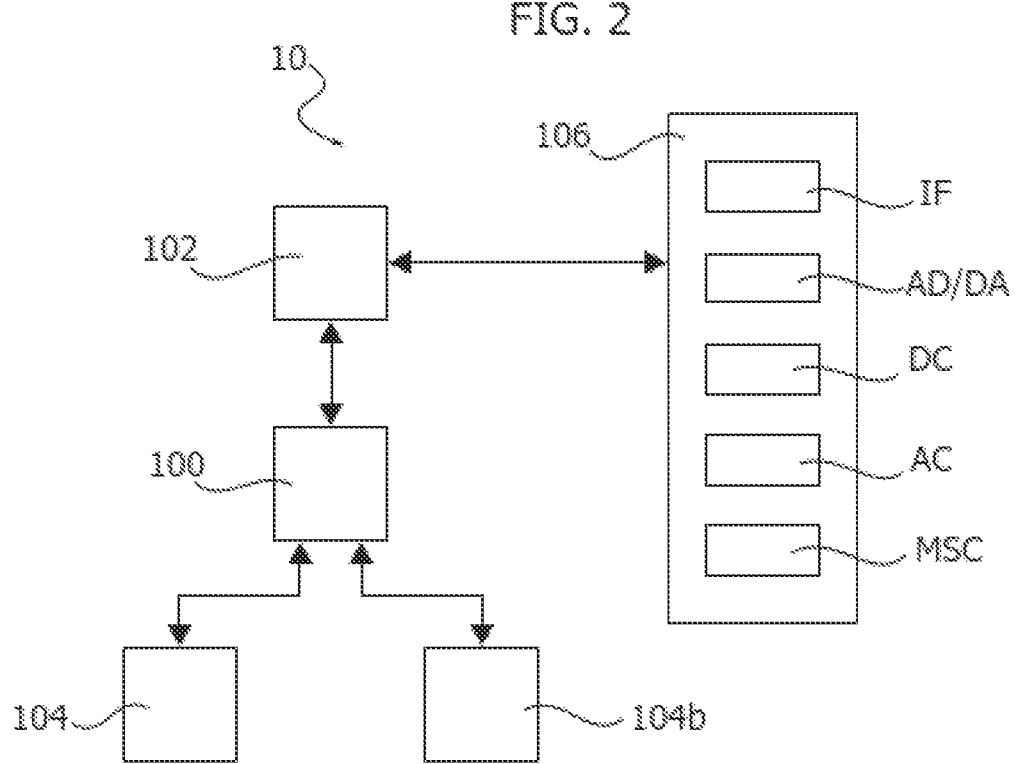
FIG. 2 shows an example of a processing system, such as a microcontroller.
Figure 3:
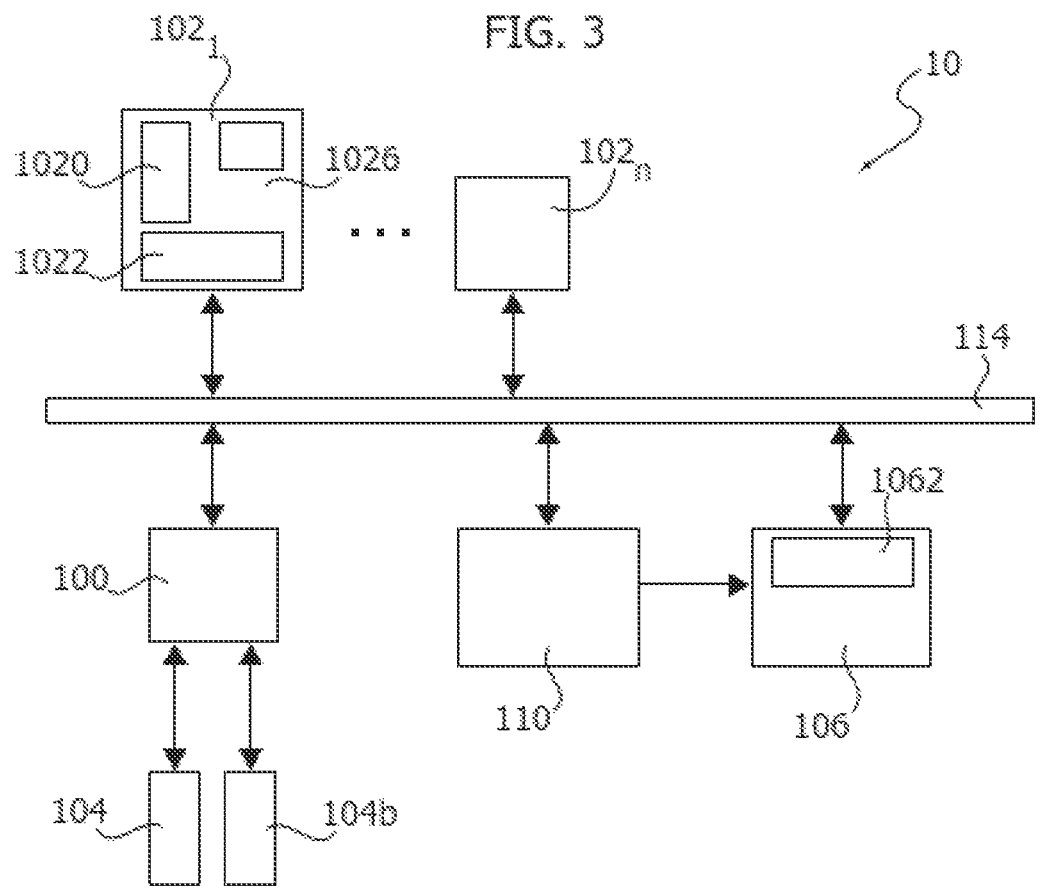
FIG. 3 shows an example of a multi-core processing system.
Figure 4:
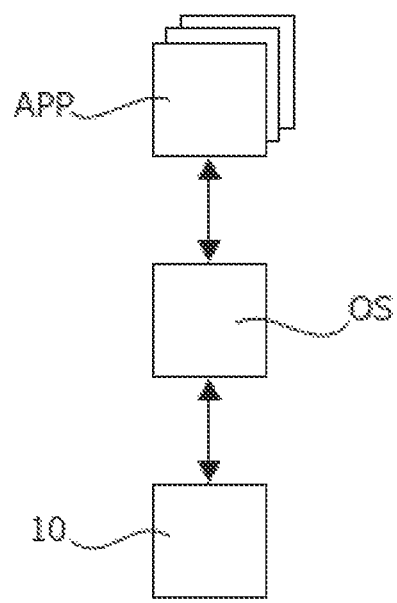
FIG. 4 shows an example of the software executed by a processing system, wherein the software is divided into an operating system and applications.
Figure 5:
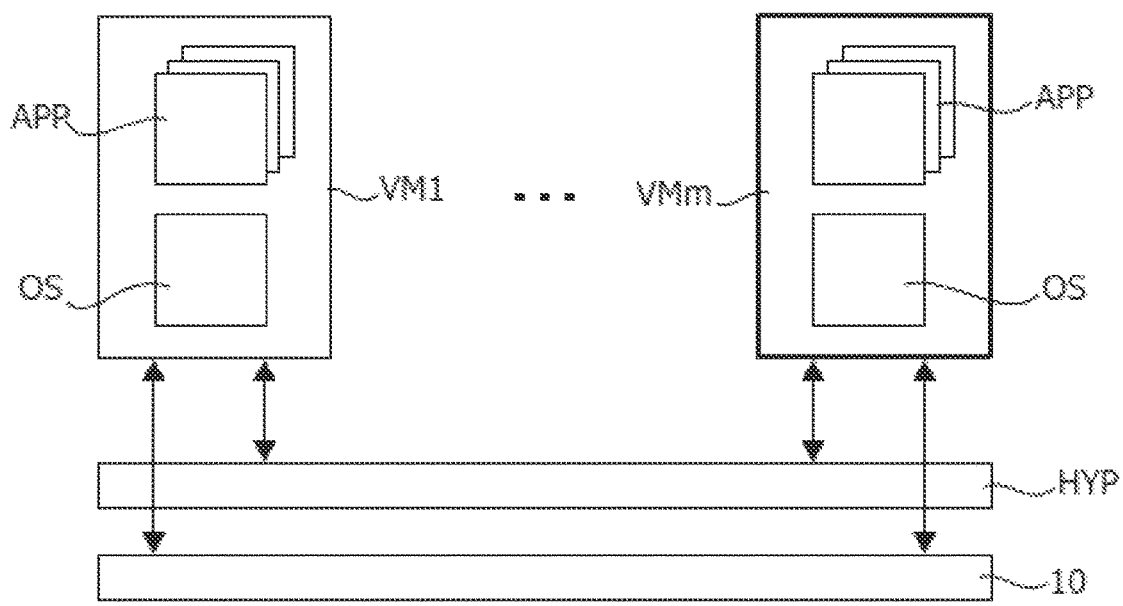
FIG. 5 shows an example of the software executed by a processing system, wherein the software is divided into a hypervisor and a plurality of virtual machines.

For example, in line with the previous description, the HOST 40 may comprise at least one microprocessor 1020 and one or more volatile memories 104*b* connected via a suitable communication system/interconnect 114. As described with respect to FIGS. 2 and 3, the memory 104*b* may be connected to the communication system 114 via a memory controller 104 (not shown in FIG. 7). The processing system 10*a* comprises also one or more non-volatile memory 104 for storing the host software executed by the microprocessor 1020, indicated in the following also as HOST SW, and optionally one or more resources 106 (as described with respect to FIG. 2).

Substantially, an HSM implements a separate digital processing system, which is connected via one or more communication interfaces to the HOST 40. For example, in the embodiment considered, the HSM 20 comprises at least one microprocessor 202. Generally, the software executed by the microprocessor 202 may be stored to a dedicated memory area in the non-volatile memory 104, or to a dedicated non-volatile memory 204 of the HSM 20.

In various embodiments, the cryptographic operations may be implemented completely via software instructions executed by the microprocessor(s) 202. Alternatively, the HSM 20 may comprise a cryptographic co-processor 206 and at least part of the cryptographic operations may be executed via the cryptographic co-processor 206. In both cases, the cryptographic operations may be managed by the HSM software executed by the microprocessor(s) 202, indicated in the following also as HSM SW. In various embodiments, the microprocessor(s) 202, and the optional non-volatile memory 204 and/or the optional cryptographic co-processor 206 are connected via a suitable communication system/interconnect 214.

Accordingly, since the HOST 40 and the HSM 20 are two separate sub-systems, a suitable communication system 30 is used to exchange data between the HOST 40 and the HSM 20. For example, in the embodiment considered, the HOST 40 comprises a transmitter circuit 300 configured to forward a command received from the communication system 114 to the HSM 20. For example, the transmitter circuit 300 may comprise a slave communication interface of the communication system 114 configured to receive write requests addressed to a given address (or address range) in the physical address range of the communication system 114. Accordingly, the transmitter circuit 300 may extract a command from the write request and forward the command to the HSM 20. In general, the transmitter circuit 300 may generate the command also based on the data received via a plurality of write requests. For example, the command may indicate an encryption, a decryption, or a signature verification request. For example, for this purpose, the HSM 20 may use one or more pairs of private and public keys.

In turn, the HSM 20 comprises a receiver circuit 302 configured to receive the command from the transmitter circuit 300. The receiver circuit 302 is also configured to forward the received command to the microprocessor 202 or directly the co-processor 206. For example, the receiver circuit may comprise for this purpose a master communication interface for the communication system 214. Alternatively, the receiver circuit 302 may comprise a slave interface, and the receiver circuit 302 may be configured to generate an interrupt IRQ1 for the microprocessor 202, whereby the microprocessor 202 may be configured to obtain the command by sending a read request to the receiver circuit 302, e.g., by sending a read request comprising an address associated with the receiver circuit 302 to the communication system 214.

In various embodiments, the HSM 20 comprises also a transmitter circuit 304 configured to forward a response received from the communication system 214 to the HOST 40. For example, the transmitter circuit 304 may comprise a slave communication interface of the communication system 214 configured to receive write requests addressed to a given address (or address range) in the physical address range of the communication system 214. Accordingly, the transmitter circuit 304 may extract response data from the write request and forward the response data to the HOST 40. For example, the write request indicating a response may be generated by the microprocessor 202 or the co-processor 206. In general, the transmitter circuit 300 may generate the response also based on the data received via a plurality of write requests.

In turn, the HOST 40 comprises a receiver circuit 306 configured to receive the response from the transmitter circuit 304. The receiver circuit 306 is also configured to forward the received response to the microprocessor 1020. For example, the receiver circuit may comprise for this purpose a master communication interface for the communication system 114. Alternatively, the receiver circuit 306 may comprise a slave interface, and the receiver circuit 306 may be configured to generate an interrupt IRQ2 for the microprocessor 1020, whereby the microprocessor 1020 may be configured to obtain the response by sending a read request to the receiver circuit 306, e.g., by sending a read request comprising an address associated with the receiver circuit 306 to the communication system 114.

In general, also any other communication system 30 may be used to exchange commands and response data between the HOST 40 and the HSM 20.

Accordingly, in various embodiments, the data to be processed may be transmitted via the command transmitted by the interface 300 and the processed/response data may be returned via the response transmitted by the interface 304.

Alternatively, in various embodiments, the data to be processed and the processed data are exchanged via a volatile memory 104*b* of the HOST 40. For example, in this case, the microprocessor 1020 may store the data to be processed to a given message memory area 1040 in the volatile memory 104*b* (or a dedicated volatile memory) and the command transmitted to the HSM 20 comprise a command notification indicating that data in the memory 104*b* have to be processed. In turn, once having received the command notification, the HSM 20 may process the respective data in the volatile memory 104*b*. In general, the HSM 20 may store the processed data to the same message memory area 1040 or a different memory area, e.g., in the volatile memory 104*b*, indicated in the following as buffer memory area 1042. Accordingly, when storing the processed/response data to the message memory area 1040 or buffer memory area 1042, the response received via the interface 306 may just comprise a response notification indicating that the data have been processed. In this case, in response to receiving the response notification, the microprocessor 1020 may read the response data from the volatile memory 104*b*.

For example, in various embodiments, the HSM 20 may communicate with the volatile memory 104*b* via the communication system 114. For example, for this purpose, the HSM 20 may comprise a master communication interface, such as a master interface of the microcontroller 202, an integrated DMA controller of the co-processor 206 or a general-purpose DMA controller, for sending read and write requests to the communication system 114 of the HOST. In general, these read and write requests may be sent directly to the communication system 114 or the communication system 214 may be configured to forward these requests to the communication system 114. For example, request to a given sub-range of the physical address range of the communication system 214 may be forwarded to the communication system 114.

In various embodiments, in line with the previous description, the communication system 114 and similarly the communication system 214 may comprise hardware access protections, such as one or more MMU or MPU, is order to limit (i.e., permit or inhibit) the access of master interfaces to respective address ranges. For example, in this way, the communication system 114 may be configured to permit only access to a given memory sub-range of the memory 104b. For example, the access rights may be configured to permit an access to the message memory area 1040 (and optionally the buffer memory area 1042) by the microprocessor 1020 and the HSM 20.

As mentioned in the foregoing, often modern multi-core processing systems 10a may execute a plurality of virtual machines VM and a hypervisor HYP. As described in the foregoing, shared resources are in this case usually managed by the hypervisor HYP. For example, in this case, the hypervisor HYP may configure the access rights in order to configure for each virtual machine VM a respective virtual machine memory area 1044 in the memory 104b. For example, the access rights may be configured in order to permit access to each virtual machine memory area 1044 by a respective virtual machine VM and (at least in part) the hypervisor HYP. Moreover, in this case, only the hypervisor HYP may be used to communicate with the HSM 20, e.g., by configuring the access rights in order to permit access to the message memory area 1040 only by the HSM 20 and the hypervisor HYP, and similarly permitting access to the interfaces 300 and 306 only by the hypervisor HYP, i.e., inhibiting access to the message memory area 1040 and the interfaces 300 and 306 by the virtual machines VM.

Accordingly, in various embodiments, the processing system 10a may be configured such that the virtual machines VM may communicate with the HSM 20 only via the hypervisor HYP. For example, a given virtual machine VM may store the data to be processed to the respective virtual machine memory area 1044 and send a message to the hypervisor HYP. In response to the message, the hypervisor HYP may transfer the data to be processed from the virtual machine memory area 1044 to the message memory area 1040 and may send the command notification via the interface 300 to the HSM 20. Next, in response to the response notification received from the HSM 20, e.g., the interrupt IRQ2, the hypervisor HYP may transfer the processed/response data from the message memory area 1040 (or the buffer memory are 1042) to the virtual machine memory area 1044 and send a message to the given virtual machine VM, which then may use the processed data stored to the virtual machine memory area 1044.

In the following will now be described in more detail a possible embodiment of the communication system 30. As described in the foregoing, in various embodiments, the HOST SW can request a cryptographic service to the HSM by sending a write request to the interface 300. For example, in various embodiments, the interface 300 comprises one or more registers, indicated in the following also as register(s) HOST_HSR, wherein each register HOST_HSR has associated a respective address in the physical address range of the communication system 114. Accordingly, the HOST SW may program a register HOST_HSR of the interface 300 by sending a write request to the communication system 114, wherein the write request comprises the address associated with the register HOST_HSR and the respective data to be stored to the register HOST_HSR.

In this case, the interface 302 may also comprise for each register HOST_HSR of the interface 300 a respective register, indicated in the following as register HSM_HSR, and the communication system 30 may be configured to store/mirror/copy the content of each register HOST_HSR to the respective register HSM_HSR of the interface 302, thereby transferring the data from the HOST 40 to the HSM 20.

For example, in various embodiments, the interface 300 comprises a single register HOST_HSR, which contains one or more flags, which, once asserted, are mirrored to corresponding bits of the register HSM_HSR, i.e., once a bit of a register HOST_HSR is asserted by the HOST SW, the associated bit in the register HSM_HSR is asserted. In various embodiments, the microprocessor 202, i.e., the HSM SW, may then obtain the content of the register HSM_HSR. For example, once a bit in the register HSM_HSR is asserted, the interface 302 may generate an interrupt IRQ1 for the microprocessor 202. Alternatively, the microprocessor 202 may poll (e.g., periodically read) the content of the register HSM_HSR.

In various embodiments, the data stored to the register HOST_HSR and the register HSM_HSR comprise a command notification used to notify a cryptographic request, i.e., the data stored to the registers HOST_HSR and HSM_HSR do no indicate the requested cryptographic service and do not contain possible data to be processed by the requested cryptographic service. Conversely, the additional data are provided to the HSM 20 by storing the respective data via the HOST SW to the message memory area 1040, before programming the register HOST_HSR. Those of skill in the art will appreciate that various formats of data may be used to organize the command data in the message memory area 1040. For example, the command data may be organized according to the Secure Hardware Extensions (SHE) specification.

In various embodiments, the response/answer by the HSM SW may be communicated in a similar manner. For example, in various embodiments, the interface 304 comprises a single register HSM_HSA, which contains one or more flags, which, once asserted, are mirrored to corresponding bits of a register HSM_HSA of the interface 306, i.e., once a bit of a register HSM_HSA is asserted by the HSM SW, the associated bit in the register HOST_HSA is asserted. In various embodiments, the microprocessor 102, i.e., the HOST SW, may then obtain the content of the register HOST_HSA. For example, once a bit in the register HOST_HSA is asserted, the interface 306 may generate an interrupt IRQ1 for the microprocessor 1020. Alternatively, the microprocessor 1020 may poll (e.g., periodically read) the content of the register HOST_HSA.

Accordingly, also the data stored to the register HSM_HSR and the register HOST_HSR may just comprise a response notification used to notify a response, i.e., the data stored to the registers HSM_HSR and HOST_HSR do no comprise the processed data or the result of the processing, but just notify the response. Conversely, the additional data are provided to the HOST 40 by storing the respective data (e.g., via the HSM SW or the co-processor 206) to the message memory area 1040 or the buffer memory area 1042, before programming the register HSM_HSA. In response to notification of the response, the HOST SW may then inspect these data stored to the message memory area 1040 or the buffer memory area 1042, and evaluate the result of the cryptographic service request. Those of skill in the art will appreciate that various formats of data may be used to organize the response data in the message memory area 1040 or the buffer memory area 1042. For example, the data may be organized according to the Secure Hardware Extensions (SHE) specification.

Accordingly, in the embodiment considered, the exchange via the communication systems 30 permits to manage cryptographic service requests generated by a single software task of the HOST SW.

In fact, when the virtual machines VM could access directly the HSM 20, a request from a first virtual machine VM may still be pending, when a second virtual machine VM is scheduled in execution by the hypervisor and could overwrite the data in the message memory area 1040 prepared by the first virtual machine VM. Accordingly, when the virtual machines VM may directly access to message memory area 1040, the HOST SW has to ensure that cryptographic services requested by several virtual machines VM are queued until the HSM has processed (or at least read) the command data associated to the cryptographic service request. Moreover, once the cryptographic service request has been notified to the HSM 20, the HSM reads the data of the request from a predetermined memory address associated to the message memory are 1040. However, this also implies that a complete separation of the virtual machines is not guaranteed, which breaks the whole concept of both virtualization and safety (freedom from interference). For example, this implies that in case of different virtual machines VM with different safety levels (i.e., in case a virtual machine VM is developed in either SW or HW with a different probability to incur in some run-time errors), a virtual machine VM based on a lower safety level could by mistake overwrite the information in the message memory area 1040 originally prepared to another virtual machine VM.

For this reason, as described in the foregoing, in traditional solutions the cryptographic services are managed by the hypervisor HYP. For example, as described in the foregoing, in various embodiments, the hypervisor HYP may configure the access rights such that the virtual machines VM may not access directly the message memory area 1040 and the interface 300, and all cryptographic service requests are exchanged via the hypervisor HYP. This solution solves the above problems but it has the drawback of being slow, because a virtual machine VM should pass the command data identifying the requested service to the hypervisor HYP, which shall queue and manage them, write the command data for the selected service in the message memory area 1040, and finally start the communication with the HSM 20.

Alternatively, the hypervisor may temporarily re-configure the access rights and permit that a given virtual machine VM (having sent a request to the hypervisor HYP) may temporarily have exclusive access the HSM 20 (i.e., the interface 300 and the message memory area 1040). However, in this case, the processing system 10a should correctly route the HSM response/answer notification to the proper virtual machine VM having requested the cryptographic service. In fact, once the response data has been written to the memory 104b (message memory area 1040 or buffer memory area 1042), the HSM 20 returns a response notification indicating that the data processing is completed. For example, for this purpose, the respective virtual machine VM may poll the register HOST_HSR or the interface 306 may generate an interrupt IRQ2 based on the content of the register HOST_HSR. However, this interrupt IRQ2 should then be routed to the microprocessor 1020 executing the virtual machine VM having requested the cryptographic service. However, the HSM shown in FIG. 7 is unable to track, which virtual machine has requested the cryptographic service. In principle, this could be solved by providing plural request flags in the register HOST_HSR, one for each virtual machine, and respective answer/response flags in the register HOST_HSR, thereby generating respective interrupt signals for each virtual machine VM. However, also such a solution is inefficient, e.g., because a given virtual machine VM may be executed on different microprocessors 1020.

Accordingly, in various embodiments, the data stored to the register HOST_HSR may also indicate an address where the command data identifying the cryptographic request are stored, and an address where the response data identifying the response should be stored. For example, in this case, the command and response data may not be passed through the hypervisor HYP, but the cryptographic request sent to the HSM 20 may indicate that the HSM should read the command data to be processed from a (private) virtual machine memory area 1044 and/or should store the response data to the respective virtual machine memory area 1044, thereby essentially implementing a message memory area and an optional buffer memory area for each virtual machine VM arranged to execute cryptographic operations. However, also in this case, the communication with the communication system 30 in order to send requests to the HSM 20 should be managed by the hypervisor HYP. While such a solution improves the performance of the cryptographic operations, indeed the HSM 20 must be able to access various virtual machine memory areas 1044, which may constitute a security risk, because the HSM 20 does not know, whether a given indicated memory area indeed belongs to the virtual machine VM having sent the cryptographic service request. Accordingly, as indicated in the foregoing, in order to clearly separate the virtual machines VM, it is usually advisable that the hypervisor HYP also manages the data transfer between the HSM and the virtual machines VM.

Figure 8:
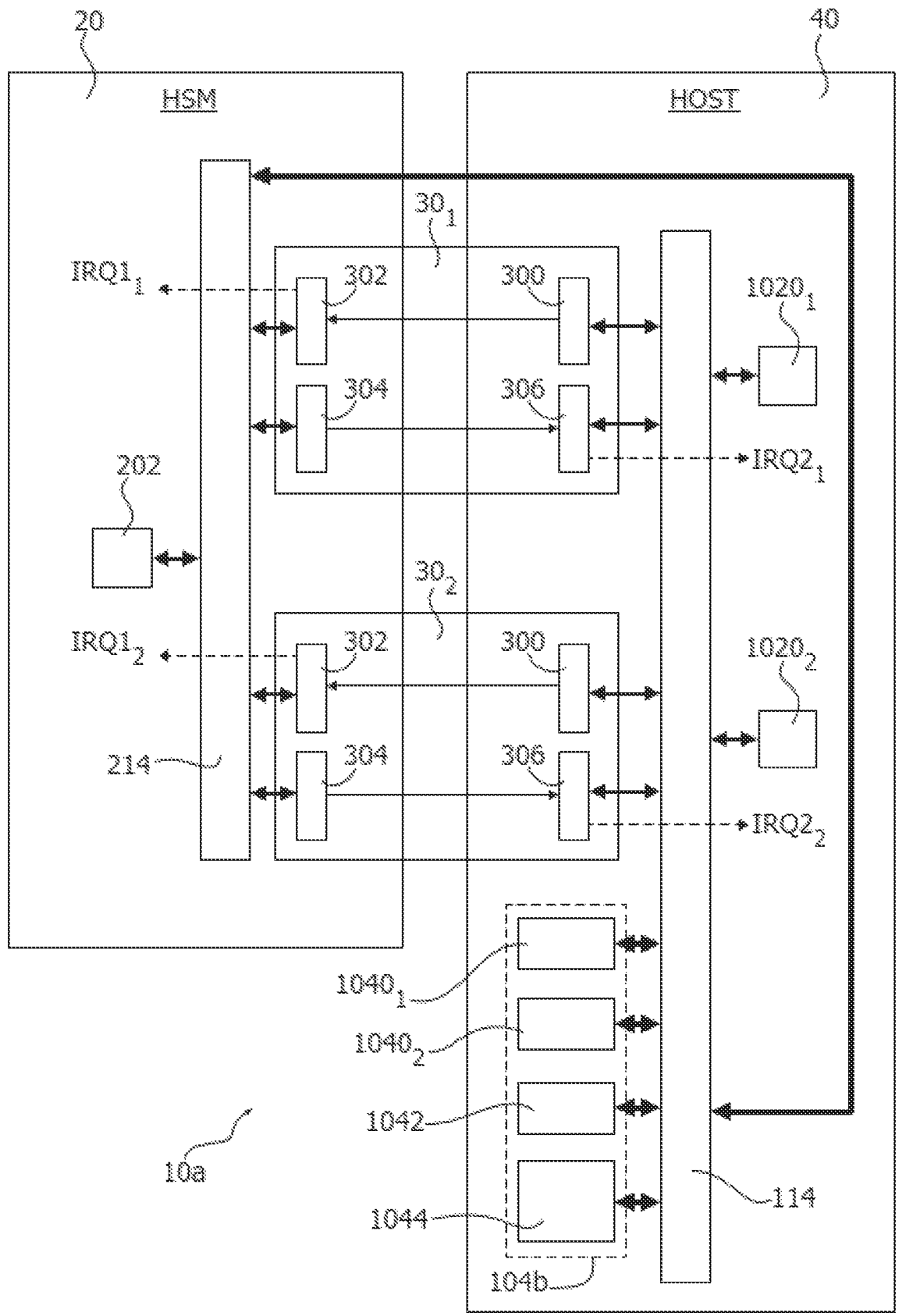
FIG. 8 shows a second embodiment of a multi-core processing system comprising a hardware secure module.

FIG. 8 shows a second embodiment of a processing system 10a, which overcomes (at least in part) the above drawbacks.

Specifically, in the embodiment considered, the processing system comprises a plurality of communication systems 30, such as a communication system 30 for each microprocessor 1020 of the processing system 10a or preferably each virtual machine VM executed by the processing system 10a. For example, in FIG. 8 are shown two communication systems 301 and 302 for two microprocessors $1020_1$ and $1020_2$ configured to execute respective virtual machines VM. Moreover, the message memory area 1040 comprise for each communication systems 30 a respective message memory (sub-)area, such as message memory areas $1040_1$ and $1040_2$. Accordingly, the HSM SW may determine for each communication system 30 a respective cryptographic service requests, e.g., by monitoring the register HSM_HSR of the respective interface 302, or by monitoring an interrupt signal generated by the respective interface 302, such as interrupts $IRQ1_1$ and $IRQ1_2$ generated by the communication systems $30_1$ and $30_2$, respectively. Accordingly, in the embodiment considered, the HSM 20 can associate each request to a respective register HSM_HSR and a respective message memory area 1040 (e.g., $1040_1$ or $1040_2$).

Accordingly, in order to ensure a separation between the virtual machines VM, the hypervisor HYP may configure the access rights of the communication system 114 such that the first virtual machine VM executed on the first microprocessor $1020_1$ may access (and the second virtual machine VM executed on the second microprocessor $1020_2$ may not access) the first message memory area $1040_1$ and the interface 300 (and if required the interface 302) of the first communication system 301, and the second virtual machine VM executed on the second microprocessor $1020_2$ may access (and the first virtual machine VM executed on the first microprocessor $1020_1$ may not access) the second message memory area $1040_2$ and the interface 300 (and if required the interface 302) of the second communication system 302. Similarly, the hypervisor may also configure respective buffer message areas 1042 for each virtual machine VM.

As described in the foregoing, the read access to the interfaces 306 of the communication systems 30 is purely optional, because each communication system 30 may also generate directly an interrupt IRQ2. For example, in the embodiment considered, the interface 306 of the first communication system 301 generates an interrupt IRQ21 for the microprocessor $1020_1$ and the interface 306 of the second communication system 302 generates an interrupt IRQ22 for the microprocessor $1020_2$.

The inventor has observed that this solution may be sufficient for a small number of virtual machines, but it is not feasible for a higher number of virtual machines VM, as each of them should have its own instance for communicating with the HSM 20, i.e., a respective communication system 30 and a respective message memory area 1040 (and optionally a respective buffer memory area 1042). In fact, this solution puts a constraint on the maximum number of virtual machines able to request the HSM service, as this number cannot be higher than the number of instances for communicating with the HSM 20. Moreover, while such a solution permits to separate the interfaces 301 and 302, the HSM 20 may still access various virtual machine memory areas 1044.

Figure 9:
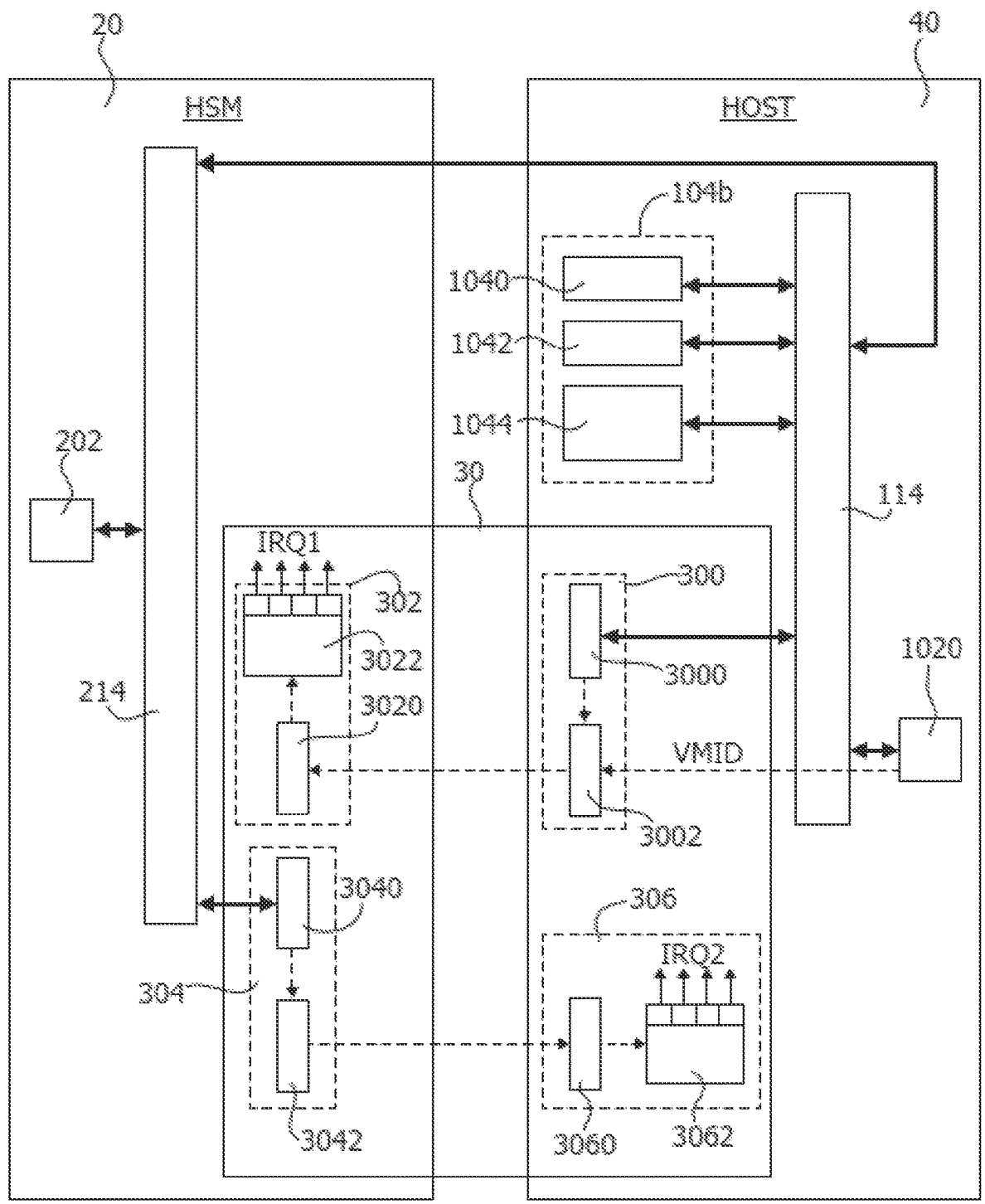
FIG. 9 shows a third embodiment of a multi-core processing system comprising a hardware secure module.

FIG. 9 shows a third embodiment of a processing system 10a. Specifically, in the embodiment considered, the HSM 20 is configured to obtain the virtual machine ID VMID of the virtual machine VM having requested a cryptographic service.

For this purpose, in various embodiments, each master interface of the communication system 114 is configured to send read and/or write requests REQ to the communication system 114 and eventually receive a respective response to the request from the communication system 114, wherein each read or write request comprises a Virtual Machine ID (VMID) and optionally an Address Space ID (ASID).

Figures 10, 11:
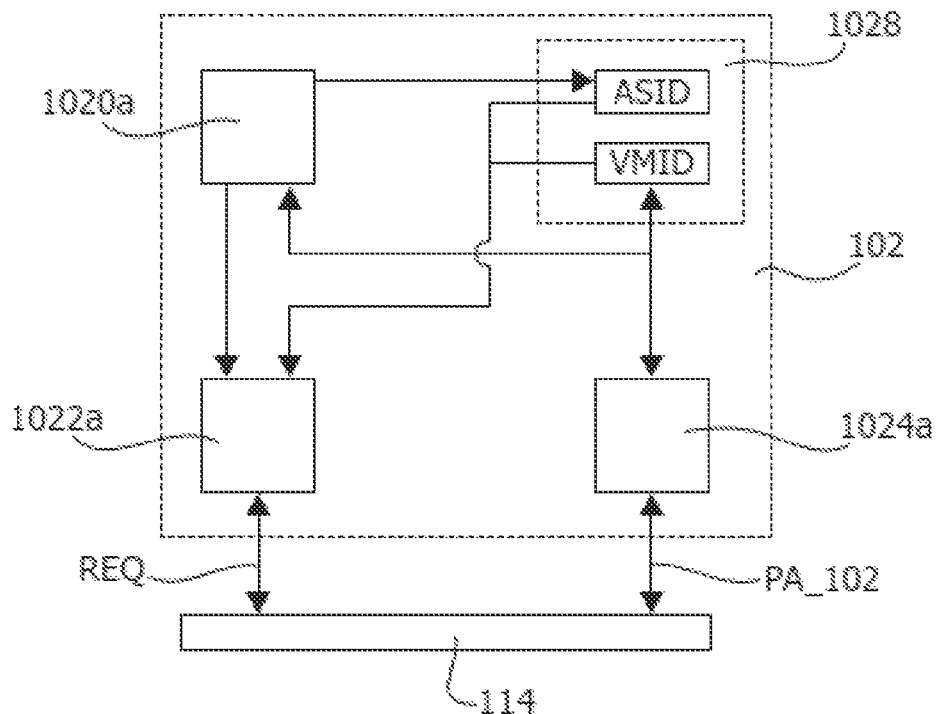
FIG. 10 shows an embodiment of a processing core adapted to be used in the processing system of FIG. 9.
FIG. 11 shows an embodiment of virtual machine configuration data adapted to be used in the processing system of FIG. 9.

For example, FIG. 10 shows an embodiment of a processing core 102a, wherein a master interface 1022a of the processing core 102a is configured to send a read or write request REQ to the communication system 114. Specifically, such a read or write request REQ comprises a physical address PA associated with a slave interface to which the request REQ should be send. For example, in this way, a microprocessor 1020a of the processing core 102a may send a read or write request REQ to a given destination, such as a resource 106, by sending via the master communication interface 1022a a request REQ comprising a physical address associated with the slave interface of the destination. For example, the destination address may be associated with a (configuration and/or status) register of a peripheral 106 or a memory address managed by a memory controller 100.

In the embodiment considered, the master interface 1022a is configured to read the VMID and optionally the ASID (to be included in the request REQ) from one or more registers 1028 of the processing core 102a. For example, the processing system 10a may be configured such that the register 1028 configured to store the VMID may be programmed by the hypervisor HYP, and the register ASID may be programmed via an operating system OS executed by the microprocessor 1020 of the processing core 102a. For example, in order to program the register 1028 configured to store the VMID, the respective register may be connected via a slave interface 1024a of the processing core 102a to the communication system 114. Generally, while FIG. 10 shows that the slave interface 1024a is connected to the communication system 114, indeed the communication system 114 may comprise in addition to the system bus or NoC, also an additional co-processor bus, e.g., connecting the microprocessors 1020a of the same processing core 102a or all processing cores 102a. For example, in an ARM core, the register 1028 used to store the VMID associated with a microprocessor 1020a is called VSCTLR. Generally, while the master interface 1022a and slave interface 1024a are shown as sperate logic blocks, indeed these interfaces may reuse the same physical interface for the communication with the communication system 114, and/or may be integrated in the microprocessor 1020a. Similarly, also other master interfaces, such as integrated or general-purpose DMA controllers, may be configured to include a programmable VMID (and optionally a programmable ASID) into the requests sent by the respective master interface.

For example, as described in the background section, in various embodiments, the communication system 114 may use the VMID and optionally the ASID included in the requests REQ in order to implement an address protection. In general, such protection may be implemented before a request is forwarded by the master interface to the communication system 114, within the communication system 114, and/or within the slave interface receiving the request. For example, in various embodiments and as described in document US 2022/0357973 A1, each slave interface of the communication system 114 is configured to forward or inhibit the forwarding of a request REQ to an associated circuit based on the VMID (and optionally ASID) included in the request and one or more access rights configured for the slave interface. For example, in various embodiments, the access rights may indicate for each address (or address range) managed by the slave interface, one or more VMIDs (and optionally one or more respective ASIDs) permitted to access the address (or address range), i.e., only the indicated VMID or VMIDs (or combination(s) of VMID and ASID) may access the respective address (or address range) and unspecified VMIDs (or unspecified combinations of VMID and ASID) may not access the respective address. For example, in various embodiments, the processing system 10a is configured, such that the hypervisor HYP may set the VMID of each master interface and the access rights of each slave interface.

As shown in FIG. 9, the HSM 20 is connected again to the HOST 40 via a communication system 30. Specifically, the communication system 30 comprises again an interface 300. In various embodiments, the interface 300 comprises a slave interface of the communication system 114, i.e., the interface 300 has associated at least one address of the communication system 114 and is configured to receive via the communication system requests REQ addressed to the respective address or addresses, in particular at least write requests. For example, the interface 300 may again comprise a request register HOST_HSR, indicated in FIG. 9 as register 3000, in order to set a bit for notifying a cryptographic request to the HSM 20.

Moreover, since the (e.g., write) request REQ received via the interface 300 comprises also a VMID of the master interface having sent the request REQ, the slave interface 300 is configured to extract the VMID from the request and store the VMID to a register 3002 of the interface 300. In various embodiments, the slave interface 300 may also not even comprise a register 3000, because it is sufficient that the interface is able to determine whether a write request indicative of a cryptographic request has been received (e.g., because one or more predetermined bits of the write request are asserted), and extract the respective VMID from the write request.

In various embodiments, in response to the notification of a cryptographic service request, the slave interface 300 provides then the extracted VMID, e.g., the content of the register 3002, to the receiver interface 302 of the HSM 20. For example, in the embodiment considered, the interface 302 comprises a register 3020, and the interfaces 300 and 302 are configured to, in response to a cryptographic service request, copy/mirror/transfer the VMID included in the respective write request, e.g., the content of the register 3002, to the register 3020. As mentioned before, in various embodiments, the register HOST_HSR 3000 may be omitted or not mirrored in the HSM space. For example, the register 3000 may also be implemented with a write-only register in the HOST, which is just used to capture the VMID of the incoming transaction upon a write operation. In general, also other solutions may be used to communicate the VMID included in the write request to the HSM 20.

In line with the previous description, in various embodiments, the slave interface 300 may also verify one or more access rights. For example, the slave interface 300 may verify whether the VMID included in the received request corresponds to one or more permitted VMIDs, thereby limiting the VMIDs, which may access the slave interface 300. As mentioned before, the permitted VMIDs may be specified via the hypervisor HYP.

Accordingly, in various embodiments, in response to a (permitted) write request received via the slave interface 300, the receiver interface 302 of the HSM 20 receives data which indicate a virtual machine requesting a cryptographic service, i.e., the VMID included in the respective write request.

In various embodiments, in response to receiving a VMID, e.g., in response to a programming of the register 3020, the receiver interface 302 generates again an interrupt IRQ1 for the microprocessor 202 of the HSM 20. Alternatively, the HSM SW may determine a cryptographic service request by monitoring the register 3020. In general, also other solutions may be used to determine that a VMID has been transmitted from the interface 300 to the HSM.

For example, in various embodiments, the receiver circuit 302 may be configured to generate a plurality of status bits. For example, in various embodiments, the receiver circuit 302 comprises also a matching circuit 3022, and the VMID stored to the register 3020 is provided to the matching circuit 3022. Specifically, in various embodiments, the matching circuit 3022 is configured to generate a plurality of status bits. Specifically, in various embodiments, the matching circuit 3022 is configured to store for each status bit respective virtual machine configuration data VMCD, wherein each set of virtual machine configuration data comprise respective VMID matching data comprising one or more VMIDs. Generally, in case a status bit is unused, the respective VMID matching data may also be empty. For example, the HSM 20 may be configured to obtain the virtual machine configuration data VMCD by:

loading these data as configuration data from a non-volatile memory of the processing system 10a, such as the non-volatile memory 104 or 204, e.g., at the start-up of the processing system 10a;

reading these data from a volatile memory 104b of the HOST 40, e.g., in response to given events, such as receiving a cryptographic request (or a dedicated update request indicated via an additional flag in the register HOST_HSR 3000) from the slave interface 300; and/or receiving these data via one or more additional registers of the slave interface 300.

For example, in various embodiments, the virtual machine configuration data VMCD are stored to a predetermined memory area of the volatile memory 104b of the HOST 40 and/or additional configuration registers of the interface 300, wherein the processing system 10a is configured such that this predetermined memory area and/or additional configuration registers are programmable only by the hypervisor HYP.

Accordingly, in response to receiving a VMID, the matching circuit 3022 may compare the received VMID (e.g., the VMID stored to the register 3020) with the matching data associated with each status bit, and assert the status bit when the received VMID matches one of the VMIDs included in the matching data.

Accordingly, in various embodiments, in response to the interrupt IRQ1 generated by the receiver circuit 302, the HSM SW executed by the microprocessor 202 may read the VMID from the register 3020 and/or obtain the status bits generated by the matching circuit. For example, the status bits may be stored to a register of the matching circuit 3022, which is readable via software instructions executed by the microprocessor 202.

In various embodiments, each status bit may also be used to generate directly a respective interrupt signal IRQ1 for the microprocessor. For example, in various embodiments, the matching circuit 3022 is configured to generate 8 or 16 status bits (and respective interrupt signals IRQ1) via a respective number of virtual machine configuration data sets, which in turn comprise respective matching data. Accordingly, in this case, the matching circuit 3022 implements essentially an interrupt router configure to generate a given interrupt when the received VMID corresponds to a given VMID defined via the matching rules of the virtual machine configuration data. In various embodiments, each interrupt generated as a function of a status bit may also be enabled via a respective (programmable) interrupt enable flag of the matching circuit 3022.

Accordingly, in various embodiments, the matching circuit 3022 may be configured to assert a given status bit and a respective interrupt IRQ1 when the received VMID corresponds to a given VMID. Accordingly, in various embodiments, instead of reading the VMID from the register 3020 or the status bits of the matching circuit 3022, the HSM SW executed on the microprocessor 202 may determine, which VMID has requested a cryptographic service implicitly based on the generated interrupt IRQ1. For example, each interrupt IRQ1 may be used to trigger the software execution of the HSM SW at a different address, whereby a different software routine may be started for each received VMID.

In general, instead of generating interrupt signals for the microprocessor 202, the status bits/interrupt signals IRQ1 may also be used to directly trigger the execution of a cryptographic co-processor 206.

Accordingly, once having determined which VMID has requested a cryptographic service (e.g., based on the VMID stored to the register 3020, the status bits of the matching circuit 3022 and/or implicitly via the generated interrupt IRQ1), the HSM 20 may access the message memory area associated with the virtual machine having requested the cryptographic service. In various embodiments, each VMID may have associated a predetermined and fixed addresses for a respective message memory area 1040 (adapted to store command data indicating which cryptographic service should be executed, possibly also including respective data to be processed) and optionally a respective buffer memory area 1042 (adapted to store response data of the request, possibly including processed data).

Conversely, in various embodiments, the virtual machine configuration data VMCD comprise for this purpose a start address MA of a respective message memory area 1040 and optionally a start address BA of a respective buffer memory area 1042. For example, in this way, by programming the virtual machine configuration data VMCD, each virtual machine VM may have a respective message memory area 1040 and optionally a respective buffer memory area 1042, which may also be stored in the private virtual machine memory area 1044 of the respective virtual machine. Accordingly, in various embodiments, the virtual machine configuration data VMCD may comprise the matching data (when a matching circuit 3022 is used), and/or the address data indicating the positions of the memory area used to store the command data and the memory area used to store the response data.

For example, FIG. 11 shows an embodiment of the virtual machine configuration data VMCD, wherein each entry is associated with a respective status bit/interrupt signals IRQ1, such as interrupt signals $IRQ1_1$, $IRQ1_2$, etc., and comprises a field for storing a respective VMID, such as $VMID_1$, $VMID_2$, etc. for the interrupt signals $IRQ1_1$, $IRQ1_2$, etc., a field for storing a respective start address MA of a message memory area, such as $MA_1$, $MA2$, etc., and an optional field for storing a respective start address BA of a buffer memory area, such as $BA_1$, $BA_2$, etc., As mentioned before, in various embodiments, the virtual machine configuration data VMCD, and thus the address data MA and BA, may be (only) programmable by the hypervisor HYP. Alternatively, the address data (MA and BA) associated with a given virtual machine VM may be programmable by the respective virtual machine VM (and optionally the hypervisor HYP). For example, in this case, each virtual machine VM may configure the address of the respective message memory area 1040 and optionally the address of the respective buffer memory area 1042.

Accordingly, in various embodiments, the HSM 20 may now access the message memory area 1040 associated with the VMID having requested the cryptographic service, e.g., as indicated via the start address MA associated with the received VMID, by sending read requests to the communication system 114. Specifically, in various embodiments, the HSM 20 comprises for this purpose a master communication interface, wherein this master interface is configured to include in the read requests the VMID of the virtual machine VM having requested the cryptographic service, e.g., the VMID stored to the register 3020.

For example, in various embodiments, the master interface corresponds to the master interface of the microprocessor 202. In this case, similar to what has been described with respect to FIG. 10, the microprocessor 202 may configure the register VMID of the master interface, in order to store the value of the register 3020 also to the master interface of the microprocessor 202. Alternatively, the master interface used to read the data from the HOST memory may be an integrated DMA controller of the co-processor 206 or a general-purpose DMA controller of the HSM configured to automatically transfer the data from the message memory area 1040 to the co-processor 206 or a volatile memory of the HSM 20, respectively. In this case, the (integrated or general-purpose) DMA controller may directly receive the VMID of the virtual machine, e.g., the VMID stored to the register 3020. Generally, also other solutions may be used to include the received VMID, e.g., the content of the register 3020, into the requests sent from the HSM 20 to the communication system 114. For example, the VMID may be added by a gateway circuit configured to forward requests (addressed to a given address range of the communication system 214) from the communication system 214 to the communication system 114. Accordingly, also in this case, the gateway comprises a master communication interface for the communication system 114, wherein the master interface is configured to transmit the VMID received by the interface 302.

Accordingly, by reading the data stored to the message memory area 1040 associated with the virtual machine VM having requested the service, the HSM 20 may execute the requested cryptographic service. As mentioned before, the response message may be stored either to the message memory area 1040 or a dedicated buffer memory area 1042. As mentioned before, the respective address may be programmable for each VMID. Specifically, in various embodiments, the master interface (e.g., of the microprocessor 202, the DMA controller or the gateway) is configured to include also in the write requests the VMID of the virtual machine VM having requested the cryptographic service, e.g., the VMID stored to the register 3020.

Accordingly, in various embodiments, the HSM 20 may only access the address ranges to which also the virtual machine VM having requested the cryptographic service has access, i.e., data are transferred by the HSM with the VMID value inherited by the virtual machine VM requesting the service so that the HSM 20 may, e.g., read and write the virtual machine private space 1044.

When the service is completed, i.e., when the HSM has stored via the respective master interface the response data to the message memory area 1040 or the buffer memory area 1042, the HSM 20 should notify the completion of the request to the virtual machine having requested the service.

Specifically, in various embodiments, the HSM 20 comprises for this purpose again a transmitter circuit 304 and the HOST 40 comprises again a receiver circuit 306. Specifically, in various embodiments, in response to the completion of the cryptographic service request, the interface 304 provides the VMID having requested the cryptographic service, e.g., the content of the register 3020, to the receiver interface 306 of the HOST 40.

For example, in the embodiment considered, the interface 306 comprises a register 3060, and the interfaces 304 and 306 are configured to, in response to the completion of a cryptographic service request, copy the VMID of the respective cryptographic service request, e.g., the content of the register 3020, to the register 3060. More specifically, in the embodiment considered, the interface 304 comprises a register 3042, and the interface 304 is configured to, in response to the completion of a cryptographic service request, copy the VMID of the respective cryptographic service request, e.g., the content of the register 3020, to the register 3042. In turn, the interfaces 304 and 306 are configured to copy/mirror/transfer the content of the register 3002 to the register 3020.

In general, the completion of a cryptographic service may be signaled via the HSM SW executed by the microprocessor 202 or by a cryptographic co-processor of the HSM 20. For example, the HSM SW may signal the completion by directly storing the VMID of the virtual machine having requested the cryptographic service to the register 3042. Alternatively, the HSM SW or the cryptographic coprocessor of the HSM 20 may set a (completion/response ready) flag in a register HSM_HSA 3040 of the interface 304, and the interface 304 may be configured to, in response to this completion flag, store the VMID of the virtual machine VM having requested the cryptographic service, e.g., the content of the register 3020, to the register 3042. Accordingly, in various embodiments, the register HSM_HSA 3040 may be omitted or not mirrored in the HOST space.

In various embodiments, in response to receiving a VMID, e.g., in response to a programming of the register 3060, the receiver interface 306 generates again an interrupt IRQ2 for the HOST 40. Alternatively, the HOST SW may determine the completion of a cryptographic service request by monitoring the register 3060.

Specifically, in various embodiments, the receiver circuit 306 may be configured to generate a plurality of status bits. For example, in various embodiments, comprises also a matching circuit 3062, and the VMID stored to the register 3060 is provided to the matching circuit 3062. Specifically, in various embodiments, the matching circuit 3062 is configured to generate a plurality of status bits. Specifically, in various embodiments, the matching circuit 3062 is configured to store for each status bit respective VMID matching data comprising one or more VMIDs. Generally, in case a status bit is unused, the respective VMID matching data may also be empty. In general, as mentioned before, the microprocessor 1020 executing a given virtual machine VM may be static or may change over time. Moreover, a given virtual machine VM may even not be executed currently, e.g., in case the virtual machines VM are executed based on a time scheduling.

Accordingly, in general, based on the specific application, the VMID matching data for the circuit 3062 may be static or change dynamically. For example, the matching circuit 3062 may be configured to obtain the VMID matching data by:
  e.g., in case of a static configuration, loading these data as configuration data from a non-volatile memory of the processing system, such as the non-volatile memory 104, e.g., at the start-up of the processing system 10a; or
  e.g., in case of a dynamic configuration, receiving these data via one or more additional registers of the slave interface 300 or a similar slave interface of the interface 306.

For example, in various embodiments, the interface 300 and/or the interface 306 comprise a slave interface comprising a plurality of registers for storing the VMID matching data for the matching circuit 3062. In various embodiments, the processing system 10a is configured such that these registers are only programmable by the hypervisor HYP, which may program the VMID matching data based on which virtual machine VM is executed by each microprocessor 1020 of the processing system 10a.

Accordingly, in response to receiving a VMID, the matching circuit 3062 may compare the received VMID (e.g., the VMID stored to the register 3060) with the matching data associated with each status bit, and assert the status bit when the received VMID matches one of the VMIDs included in the matching data.

Accordingly, in various embodiments, in response to the interrupt IRQ2 generated by the receiver circuit 306, the HOST SW executed by the HOST 40, such as the hypervisor HYP, may read the VMID from the register 3060 and/or obtain the status bits generated by the matching circuit 3062. For example, the status bits may be stored to a register of the matching circuit 3062, which is readable via the hypervisor HYP. In turn the hypervisor HYP may then notify the completion of the request to the virtual machine VM having requested the service, e.g., by generating an interrupt for the microprocessor 1020 executing the respective virtual machine VM.

In various embodiments, each status bit may also be used to generate directly a respective interrupt signal IRQ2 for each microprocessor 1020 of the HOST 40. Accordingly, in this case, the matching circuit 3062 implements essentially an interrupt router configure to generate an interrupt for a given microprocessor 1020 when the VMID received by the interface 306 corresponds to a given VMID defined via the VMID matching rules of the matching circuit 3062. In various embodiments, each interrupt IRQ2 generated as a function of a status bit may also be enabled via a respective (programmable) interrupt enable flag of the matching circuit 3062.

Accordingly, by programming the VMID matching data, the hypervisor HYP may program which microprocessor 1020 should receive an interrupt IRQ2 in response to the completion of a cryptographic service request, i.e., the microprocessor executing (currently) the virtual machine VM having requested the cryptographic service. Conversely, in case the respective virtual machine VM is not executed currently, the hypervisor HYP may program the VMID matching data of the matching circuit 3062 in order to generate an interrupt for the microprocessor 1020 executing the hypervisor HYP. In response to this interrupt, the hypervisor HYP may then start the execution of the virtual machine VM indicated by the register 3060 and notify the completion of the cryptographic service request to the virtual machine VM.

Accordingly, in response to the notification of the completion of the cryptographic request, the respective virtual machine VM may read the response data from the respective message memory area or buffer memory area (see also the description of FIG. 11).

Accordingly, in the embodiments described in the foregoing, the interface 300 transmits the received VMID when receiving a request for execution of a cryptographic service. Specifically, the requests are signaled by sending a write request to a given address in the physical address range of the communication system 114, typically the address associated with the register 3000.

Accordingly, in this case, all virtual machines VM (at least those expected to execute cryptographic services) need permissions to access the given address (e.g., the register 3000). Accordingly, also in this case, a virtual machine may request a cryptographic service, while a previous cryptographic request is still pending, i.e., the HSM 20 is still executing a cryptographic service. In order to solve this problem, in various embodiments, the register 3002 forms part of a First-In First-Out (FIFO) memory. Accordingly, in this case, when a plurality of virtual machines VM sequentially request cryptographic services, the requests (as identified by the respective VMIDs) are queued in the FIFO memory 3002. For example, the advancement of the FIFO memory 3002 may be triggered automatically once the HSM transmits a VMID to the receiver interface 306. In various embodiments, the interface 300 and/or 306 may also verify whether the VMID received by the interface 306 corresponds to the VMID provided by the FIFO 3002.

In various embodiments, the FIFO memory 3002 may also be configured to generate a full flag, when the FIFO memory is full. For example, the FIFO memory may comprise 4, 8 or 16 memory slots, and the full flag may be generated when the last free memory location is written. In this case, the full flag may be used to generate an error signal, which may be provided to a hardware error management circuit of the processing system 10*a* and/or used to generate an error interrupt signal, e.g., for the microprocessor 1020 executing the hypervisor HYP.

Accordingly, such a FIFO memory 3002 corresponds a scheduling circuit configured to provide the VMIDs of the virtual machines VMID having requested cryptographic services by ordering the VMIDs based on the time when the requests have been received. In general, also other scheduling schemes may be used. For example, in various embodiments, a priority may be assigned to each virtual machine VM, e.g., to each VMID, and the scheduling circuit 3002 may provide the VMIDs in sequence by ordering the VMIDs based on the priorities associated with the VMIDs. For example, in various embodiments, the operation of the scheduling circuit 3002, e.g., the priorities of the VMIDs, may be configured via configuration registers of the interface 300. For example, in various embodiments, the access rights of the processing system 10*a* are configured, such that only the hypervisor HYP may program the configuration data of the scheduling circuit 3002 or 3020.

In various embodiments, instead of using a scheduling circuit 3002 (i.e., within the HOST 40), a similar scheduling circuit may be used for the register 3020 (i.e., within the HSM 20). For example, in this case, the scheduling circuit 3020 may select the next VMID when the HSM 20 stores a VMID to the register 3042.

Figure 12:
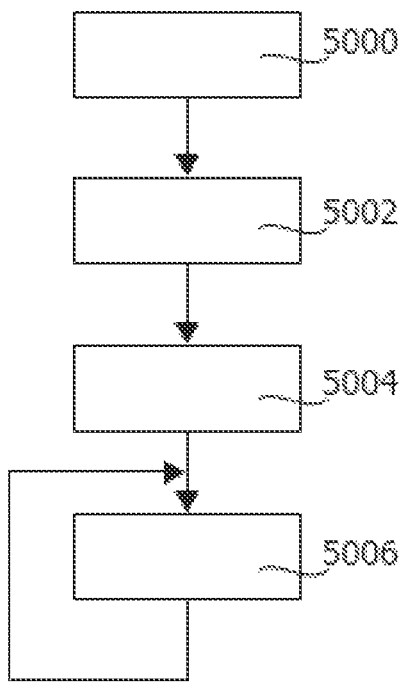
FIG. 12 shows an embodiment of the operation of a hypervisor executed by the processing system of FIG. 9.

Accordingly, as also shown in FIG. 12, in various embodiments, the hypervisor HYP may:
  configure in a step 5000 the access rights in order to configure for each virtual machine VM a respective private virtual machine memory area 1044, possibly (i.e., at least for those expected to execute cryptographic services) comprising a respective message memory area 1040 and optionally a respective buffer memory area 1042;
  optionally configure in a step 5002 the virtual machine configuration data VMCD (if not already configured via configuration data read during the start-up phase of the processing system 10*a*);
  configure in a step 5004 the access rights in order to permit that each virtual machine VM (at least those expected to execute cryptographic services) may send write requests to the slave interface 300 in order to notify a cryptographic service request, e.g., permit write access to address associated with the register 3000;
  start in a step 5006 one or more virtual machines VM and configure the VMID matching data of the matching circuit 3062 based on which virtual machine VM is executed by each microprocessor 1020 of the HOST 40.

As schematically shown in FIG. 12, when using a time scheduling of the virtual machines VM, the hypervisor HYP may repeat the step 5006, each time executing a respective set of virtual machines VM on the microprocessors 1020, wherein the set of virtual machines VM may change over time.

Figure 13:
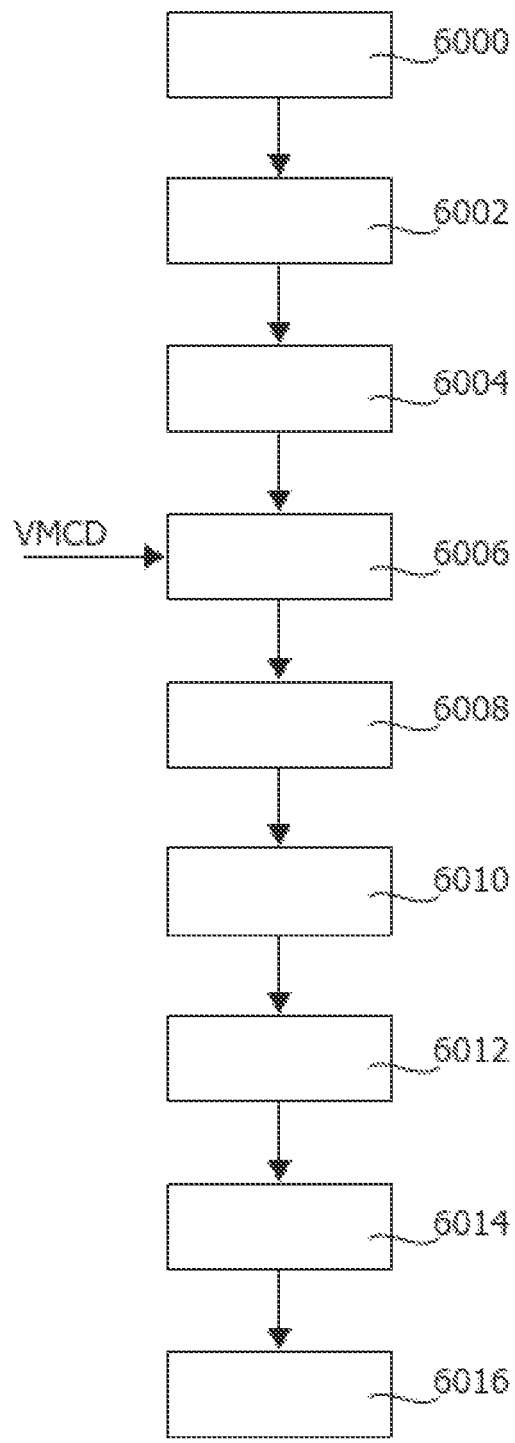
FIG. 13 shows an embodiment of the operation of a virtual machine and a hardware secure element in the processing system of FIG. 9.

Accordingly, as shown in FIG. 13, in various embodiments, a virtual machine VM may store in a step 6000 a cryptographic service request to the respective message memory area 1040 in the respective private virtual machine memory area 1044, and signal in a step 6002 the cryptographic service request via a write request to the slave interface 300. In response to the write request, the interface 300 determines/extracts in a step 6004 the VMID from the write request and notifies the cryptographic service request and the extracted VMID to the HSM 20. As mentioned before, in various embodiments, the VMID notified to the HSM 20 may be provided by a scheduling circuit 3002 or 3020, e.g., the scheduling circuit may be configured to:
  in case a single write request has been received, provide the respective VMID extracted from the write request to the HSM 20; and
  in case a plurality of write request has been received, extract from each write request the respective VMID, select one of the extracted VMIDs based on a given scheduling scheme and provide the selected VMID to the HSM 20.

In response to the notification of the cryptographic service request the HSM 20 determined in a step 6006, based on the virtual machine configuration data VMCD and the notified VMID, the address of the message memory area 1040 and optionally the buffer memory area 1042 in the private virtual machine memory area 1044, and processes in a step 6008 the respective command data of the cryptographic service request stored to the message memory area 1040, thereby storing response data to the message memory area 1040 or the buffer memory area 1042. Specifically, the HSM uses at the step 6008 read and write requests comprising the VMID notified at the step 6004, whereby the HSM 20 has the same access rights of the communication system 114 as the virtual machine VM having sent the request. As indicated in the foregoing, the processing of the command data may be performed exclusively via software executed by the microprocessor 202, exclusively via a dedicated hardware cryptographic co-processor (i.e., the HSM may even not comprise a microprocessor 202), or a combination of a software and hardware processing.

In various embodiments, the HSM 20 supports a plurality of cryptographic contexts, wherein with each context may be associated a respective cryptographic key, or pair of public and private key, which may be dedicated for a given VMID or shared for one or more (or all) VMIDs. For example, in this way, the HSM 20 may use for each VMID one or more respective cryptographic contexts. For example, the cryptographic contexts may be configurable via the virtual machine configuration data VMCD. Moreover, such separate cryptographic contexts are useful in case of a block cipher mode of operation using an initialization vector determined based on a previous cryptographic operation of the same cryptographic context.

Once having processed the cryptographic service request, the HSM 20 notifies in a step 6010 the completion of the request and the VMID of the virtual machine having requested the cryptographic service to the interface 306. When using a scheduling circuit 3002 or 3020, the step 6010 may also be used to trigger the selection of a next VMID by the scheduling circuit.

In various embodiments, in response to the notification of the response, the interface 300 generates then at a step 6012, based on the VMID matching data of the matching circuit 3062, an interrupt IRQ2 for the microprocessor 1020 executing the virtual machine VM having requested the cryptographic service. In response to this interrupt IRQ2, the virtual machine may access in a step 6014 the respective message memory area 1040 or buffer memory area 1042 and read the response data.

Accordingly, the solutions described with respect to FIGS. 9 to 13 permit that the HSM 20 generates data transfers to the HOST memory 104b using the VMID of the virtual machine VM having requested the service. For example, in this way, the HSM 20 can directly access the virtual machine memory area 1044 of the respective virtual machine. In various embodiments, the HSM notifies the VMID also via the register 3060 in order to indicate the completion of the cryptographic request. In various embodiments, once having notified the completion of the request, the HSM may also reset the register 3020 to a default value. Accordingly, in this way, any HSM transaction to the HOST not following a HOST request will be executed with this default VMID value, which may be used to block access to the virtual machine spaces, i.e., the hypervisor HYP may configure the access rights of the processing system 10a such that the default VMID of the HSM 20 may not access the private virtual machine memory areas 1044.

If the HSM is at ASIL-D level, then the transfer of the VMID from the register 3020 (when the service is requested) to the master interface sending the read and write request to the communication system 114 (when the service is effectively exploited) can be considered protected according to the ISO26262 standard.

Conversely, if the HSM is not at ASIL-D level, the HSM 20 could generate requests with a wrong VMID or wrong address.

In case of a wrong VMID, the access rights may be used to block such incorrect HSM transaction, because the VMID included in the read or write request generated by the HSM 20 will not match with address where the data is intended to be written, because this address will not be in the private memory area 1044 of the virtual machine supposed to receive the processed data from the HSM. In this case, assuming the access rights are correctly programmed by the hypervisor HYP, there will be no safety problem but rather an availability problem because the access protection will detect an error in response to a blocked read or write request.

A similar issue arises, when an incorrect address points outside the private virtual machine memory area associated with the VMID. Conversely, in case the HSM generates a transfer with the correct VMID and a wrong address, but still confined within the virtual machine space 1044 of the respective virtual machine VM, then this situation would corrupt some data within the virtual machine space 1044.

To protect the processing system 10a from this eventuality, each virtual machine could indeed have associated two VMIDs: a first ID VMIDA to be used by the virtual machine executed by the HOST 40 and a second (different) ID VMIDB to be used by the HSM 20 when receiving a request from the respective first VMIDA. In this case, the interfaces 300 and/or 302 may implement a mapping from a given VMIDA to a respective VMIDB, and similarly the interfaces 304 and/or 306 may implement a mapping from a given VMIDB to a respective VMIDA. For example, in the simplest case a given bit of the VMID, such as the Least Significant Bit (LSB) or the Most Significant Bis (MSB), could be set to a first logic level, such as '0', for the virtual machine executed by the HOST 40 and a second logic level, such as '1', for the request sent by the HSM, while the remaining bits are identical. For example, in this case, only the remaining bits could be transferred from the register 3002 to the register 3020, and similarly from the register 3042 to the register 3060.

Accordingly, in this way, the hypervisor HYP may configure the access rights such that VMIDA, i.e., the virtual machine VM, may access (read and write) a respective virtual machine memory area 1040. Moreover, the hypervisor HYP may configure the access rights such that VMIDB, i.e., the HSM 20 when executing a cryptographic service for VMIDA, may only access a message memory area 1040 and a buffer memory area 1042 in the virtual machine memory area 1040, while access to the other memory areas is inhibited. Specifically, the hypervisor may configure the access rights such that VMIDB may:

only read data from (and not write data to) the message memory area 1040 in the virtual machine memory area 1044; and (at least) write data to a buffer memory area 1042 in the virtual machine memory area 1044.

Accordingly, in this way, the VMIDB may only write data to the buffer memory area 1042, thereby avoiding that the HSM may write data to other memory areas.

In various embodiments, the VMID value may also be protected by one or more parity bits or ECC bits. For example, the verification of the additional parity or ECC bits may be done by at least one of: the HSM, e.g., the interface 302, the communication system 114 (e.g., for the requests received from the HSM) and the interface 306.

Accordingly, the solutions disclosed herein permit that the HSM directly uses the virtualization properties of the HOST SW requesting an HSM service. In this way, the security and performance of the processing system 10a may be enhanced because the HSM can generate transactions that includes the VMID, set to the same VMID of the SW requesting the HSM service (or a mapped VMIDB). In this way, there is no need to request the intervention of the hypervisor SW to dispatch the data written by the HSM into the HOST memory and the processed data can be directly written within the virtual machine space.

In general, even though the present solutions have been disclosed in the context of a hypervisor HYP and virtual machines VM, the disclosed solution ensures that the HSM 20 sends read and write requests with the VMID communicated via the write request indicating the command notification (step 6002), which permits to configure access rights in order to limit the access of the requests generated by the HSM 20 to given address ranges. Accordingly, the same structure of the processing system 10a may also be used in case no hypervisor is executed, but another HOST SW configures the VMID and access rights in order to ensure that the HSM 20 may access only given memory areas in the volatile memory 104b.

Accordingly, in various embodiments, irrespective of the software executed by the HOST 40, the processing system 10a comprises a communication system 114 having a given physical address range, wherein the processing system 10a comprises a hardware protection, such as an MMU, MPU or slave interfaces with configurable access rights, in order to limit access to addresses in the physical address range as a function of a VMID. The processing system 10a comprises also a plurality of processing cores 102a, wherein each processing core 102a comprises (at least) a respective microprocessor 1020a configured to execute software instructions, a respective register 1028 configured to store a VMID, and a respective master interface circuit 1022a configured to forward read or write requests REQ from the respective microprocessor 1020a to the communication system 114, wherein the read or write requests REQ comprises a physical address of the physical address range, and the VMID stored to the respective first register 1028.

Moreover, in various embodiments, the processing system 10a comprises a volatile memory 104b connected to the communication system 114 and an HSM 20 configured to execute cryptographic service requests. Specifically, the HSM 20 is connected via a further communication system 30 to the communication system 114. Specifically, this further communication system 30 comprises a slave interface circuit 300 connected to the communication system 114 and configured to receive (e.g., step 6002) write request from the communication system 114 and determine (e.g., step 6004) whether the received write request comprises a command notification indicating a request to execute a cryptographic service request. In response to determining that the received write request comprises a command notification, the slave interface 300 transmits the VMID included in the received write request (or a further VMID determined/mapped as a function of the VMID included in the received write request) to the HSM 20, e.g., by using the mirrored registers 3002 and 3020, whereby the HSM 20 receives a VMID which corresponds to the VMID included in the received write request (or the further VMID determined/mapped as a function of the VMID included in the received write request). Moreover, the communication system 30 comprises a register 3060 for storing a response notification. For example, as mentioned before, the HOST SW may detect the response notification by periodically reading the content of the register 3060 of by generating an interrupt IRQ2, e.g., via the matching circuit 3062.

In various embodiments, the HSM 20 is configured to, in response to receiving the VMID from the slave interface circuit 300, access (e.g., step 6006) virtual machine configuration data VMCD in order to determine address data MA (and optionally BA) as a function of the received VMID. Specifically, the address data indicate the position of a first memory area in the volatile memory 104b adapted to store command data comprising a cryptographic service request (i.e., the message memory area 1040) and a second memory area in the volatile memory 104b adapted to store response data of a cryptographic service request (i.e., the message memory area 1040 or the buffer memory area 1042). Next, the HSM 20 processes via software and/or hardware (e.g., step 6008) the command data stored to the first memory area, thereby generating response data stored to the second memory area. Specifically, in various embodiments, the HSM 20 sends for this purpose via a master interface circuit of the HSM 20 read requests to the communication system 114 in order to read the command data from the first memory area, and write requests in order to write the response data to second memory area. More specifically, in various embodiments, these read and write requests comprise the received VMID. Finally, once having processed the command data, the HSM 20 stores (e.g., step 6010) a response notification to the register 3060 of the communication system 30.

Accordingly, in various embodiments, the software executed by the microprocessors 1020 (e.g., a hypervisor or a different software task) may store a VMID to the register of a given processing core 102a and configure the access rights in order to limit the access rights for this VMID and/or the further VMID (derived from the VMID). Next, the software executed by the microprocessor 1020 of the given processing core 102a (such as a virtual machine or a different software task) may store command data to the first memory area indicated by the virtual machine configuration data VMCD and send a write request containing the command notification to the slave interface 300. In response to this command notification, the HSM 20 processes the command data and stores the response data to the second memory area, using for the respective requests the VMID stored for the given processing core 102a (or a respective mapped/derived VMIDB). Accordingly, in response to the response notification, the microprocessor 1020 of the given processing core 102a may read the response data 1020 stored to the second memory area.

In general, also any other master interface (with adequate access rights), such as another microprocessor, an integrated DMA controller of a resource 106 or a general-purpose DMA controller 110, may store the command data to the first memory area and/or read the response data from the second memory area. For example, in this way, a communication interface 106 may:

receive encrypted data and store the received encrypted data to the first memory area, or read encrypted data from the second memory area and transmit the read encrypted data.

Specifically, in this case, an integrated DMA controller of the communication interface 106 or a general-purpose DMA controller 110 may send read or write request, respectively, which comprise the VMID configured for the given processing core 102a.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
   a first communication system having a physical address range, wherein the processing system comprises a hardware address protection in order to limit access to addresses in the physical address range as a function of virtual machine identifications (VMIDs);
   a plurality of processing cores, each processing core comprising:
      a respective microprocessor configured to execute software instructions;
      a respective first register configured to store a VMID; and
      a respective master interface circuit configured to forward read or write requests from the respective microprocessor to the first communication system, the read or write requests comprising a physical address in the physical address range and the VMID stored in the respective first register;
   a volatile memory connected to the first communication system;
   a hardware secure module (HSM) configured to execute cryptographic service requests; and
   a further communication system connecting the HSM to the first communication system, wherein the further communication system comprises:
      a first communication channel comprising a slave interface circuit connected to the first communication system and configured to:
         receive a write request from the first communication system;

determine whether the received write request comprises a command notification indicating a request to execute a cryptographic service request; and in response to determining that the received write request comprises the command notification, transmit the VMID included in the received write request or a further VMID determined as a function of the VMID included in the received write request to the HSM; and a second communication channel comprising a second register for storing a response notification;

wherein the HSM comprises a master interface circuit connected to the first communication system, and wherein the HSM is configured to, in response to receiving the transmitted VMID from the first communication channel:

access virtual machine configuration data in order to determine address data as a function of the received VMID, wherein the address data indicate a position of a first memory area in the volatile memory configured to store command data comprising the cryptographic service request and a second memory area in the volatile memory configured to store response data of the cryptographic service request;

process the command data stored in the first memory area, thereby generating the response data stored in the second memory area, wherein the processing the command data comprises:

sending, via the master interface circuit of the HSM, read requests to the first communication system in order to read the command data from the first memory area, wherein the read requests comprise the received VMID; and sending, via the master interface circuit of the HSM, write requests to the first communication system in order to write the response data to the second memory area, wherein the write requests comprise the received VMID; and after processing the command data, store the response notification to the second register of the second communication channel.

2. The processing system according to claim 1, wherein the HSM is configured to obtain the virtual machine configuration data by at least one of:

reading the virtual machine configuration data from a non-volatile memory of the processing system;

reading the virtual machine configuration data from the volatile memory; and receiving the virtual machine configuration data via the slave interface circuit.

3. The processing system according to claim 1, wherein the address data comprise a first address indicate the position of the first memory area in the volatile memory configured to store the command data comprising the cryptographic service request and a second address indicating the second memory area in the volatile memory configured to store the response data of the cryptographic service request.

4. The processing system according to claim 1, wherein the first communication channel comprises a third register and a fourth register, and wherein the slave interface circuit is configured to:

in response to determining that the received write request comprises the command notification, storing the VMID included in the received write request or the further VMID determined as a function of the VMID included in the received write request to the fourth register, and transmitting at least in part a content of the fourth register to the third register;

and wherein the HSM is configured to receive the VMID from the first communication channel by reading a content of the third register.

5. The processing system according to claim 1, wherein the first communication channel comprises a scheduling circuit configured to:

receive a sequence of a plurality of write requests from the first communication system, determining for each write request a respective VMID included in the respective write request or a respective further VMID determined as a function of the VMID included in the respective received write request, selecting one of the VMID or further VMID according to a given scheduling scheme, and transmitting the selected VMID or further VMID to the HSM.

6. The processing system according to claim 1, wherein the first communication channel comprises a first matching circuit configured to generate a plurality of first interrupt signals by:

accessing the virtual machine configuration data, wherein the virtual machine configuration data are configured to store for each first interrupt signal a respective VMID, comparing for each first interrupt signal the respective VMID with the received VMID, and in response to determining that the VMID stored for a first interrupt signal corresponds to the received VMID, asserting the respective first interrupt signal.

7. The processing system according to claim 1, wherein the second communication channel comprises a fifth register, wherein the HSM is configured to store the response notification to the fifth register of the second communication channel, and the second communication channel is configured to transmit at least in part a content of the fifth register to the second register.

8. The processing system according to claim 1, wherein the response notification stored to the second register comprises the VMID included in the received write request.

9. The processing system according to claim 8, wherein the second communication channel comprises a second matching circuit configured to generate a plurality of second interrupt signals by:

accessing matching data, wherein the matching data are configured to store for each second interrupt signal a respective VMID, comparing for each second interrupt signal the respective VMID with the VMID stored to the second register, and in response to determining that the VMID stored for a first interrupt signal corresponds to the VMID stored to the second register, asserting the respective second interrupt signal.

10. The processing system according to claim 9, wherein each second interrupt signal is provided to a respective microprocessor.

11. The processing system according to claim 1, wherein the microprocessors are configured to execute a hypervisor, and first and second virtual machines, wherein the hypervisor is configured to:

configure the hardware address protection in order to configure for each of the first and second virtual machines a respective private virtual machine memory area in the volatile memory, wherein each virtual machine memory area comprises a respective first memory area configured to store the command data comprising the cryptographic service request and a respective second memory area configured to store the response data of the cryptographic service request;

configure the hardware address protection in order to permit the first and second virtual machines to send write requests comprising respective command notifications to the slave interface circuit of the first communication channel;

store a first VMID associated with the first virtual machine to the first register of a first processing core of the plurality of processing cores, and start the first virtual machine on the microprocessor of the first processing core; and store a second VMID associated with the second virtual machine to the first register of a second processing core of the plurality of processing cores, and start the second virtual machine on the microprocessor of the second processing core.

12. The processing system according to claim 11, wherein each of the first and second virtual machines is configured to:

store the command data comprising the cryptographic service request to the respective first memory area;

send the write request comprising the command notification to the slave interface circuit of the first communication channel;

determine whether the HSM stores a response notification to the second register;

in response to determining that the HSM stores a response notification to the second register, access the respective second memory area for reading the response data.

13. The processing system according to claim 1, wherein the processing system is disposed on an integrated circuit.

14. An apparatus comprising:
a plurality of processing systems, each processing system comprising:
a first communication system having a physical address range, wherein the processing system comprises a hardware address protection in order to limit access to addresses in the physical address range as a function of virtual machine identifications (VMIDs);
a plurality of processing cores, each processing core comprising:
a respective microprocessor configured to execute software instructions;
a respective first register configured to store a VMID; and
a respective master interface circuit configured to forward read or write requests from the respective microprocessor to the first communication system, the read or write requests comprising a physical address in the physical address range and the VMID stored in the respective first register;
a volatile memory connected to the first communication system;
a hardware secure module (HSM) configured to execute cryptographic service requests; and
a further communication system connecting the HSM to the first communication system, wherein the further communication system comprises:
a first communication channel comprising a slave interface circuit connected to the first communication system and configured to:
receive a write request from the first communication system;

determine whether the received write request comprises a command notification indicating a request to execute a cryptographic service request; and in response to determining that the received write request comprises the command notification, transmit the VMID included in the received write request or a further VMID determined as a function of the VMID included in the received write request to the HSM; and a second communication channel comprising a second register for storing a response notification;

wherein the HSM comprises a master interface circuit connected to the first communication system, and wherein the HSM is configured to, in response to receiving the transmitted VMID from the first communication channel:

access virtual machine configuration data in order to determine address data as a function of the received VMID, wherein the address data indicate a position of a first memory area in the volatile memory configured to store command data comprising the cryptographic service request and a second memory area in the volatile memory configured to store response data of the cryptographic service request;

process the command data stored in the first memory area, thereby generating the response data stored in the second memory area, wherein the processing the command data comprises:

sending, via the master interface circuit of the HSM, read requests to the first communication system in order to read the command data from the first memory area, wherein the read requests comprise the received VMID; and sending, via the master interface circuit of the HSM, write requests to the first communication system in order to write the response data to the second memory area, wherein the write requests comprise the received VMID; and after processing the command data, store the response notification to the second register of the second communication channel; and an additional communication system connecting the plurality of processing systems.

15. The apparatus according to claim 14, wherein the apparatus is a vehicle.

16. A method of operating a processing system, the processing system comprising:
a first communication system having a physical address range, the processing system comprising a hardware address protection in order to limit access to addresses in the physical address range as a function of virtual machine identifications (VMIDs);
a plurality of processing cores, each processing core comprising a respective microprocessor configured to execute software instructions, a respective first register, and a respective master interface circuit;
a volatile memory connected to the first communication system;
a hardware secure module (HSM) comprising a master interface circuit connected to the first communication system; and
a further communication system connecting the HSM to the first communication system, the further communication system comprising a first communication channel comprising a slave interface circuit connected to the first communication system, and a second communication channel comprising a second register for storing a response notification;

the method comprising:

storing command data comprising a cryptographic service request to a first memory area;

sending a write request comprising a command notification to the slave interface circuit of the first communication channel, the write request comprising a VMID;

determining whether the HSM stores the response notification to the second register; and in response to determining that the HSM stores the response notification to the second register, accessing a second memory area for reading response data.

17. The method according to claim 16, comprising:

configuring via a hypervisor the hardware address protection in order to configure for each of first and second virtual machines a respective private virtual machine memory area in the volatile memory, each virtual machine memory area comprising a respective first memory area configured to store respective command data comprising respective cryptographic service requests and a respective second memory area configured to store respective response data of the respective cryptographic service requests;

configuring via the hypervisor the hardware address protection in order to permit the first and second virtual machines to send respective write requests comprising respective command notifications to the slave interface circuit of the first communication channel;

storing via the hypervisor a first VMID associated with the first virtual machine to the respective first register of a first processing core of the plurality of processing cores, and starting the first virtual machine on the respective microprocessor of the first processing core; and storing via the hypervisor a second VMID associated with the second virtual machine to the respective first register of a second processing core of the plurality of processing cores, and starting the second virtual machine on the respective microprocessor of the second processing core.

18. The method of claim 17, further comprising, by the HSM in response to receiving the VMID from the first communication channel:

accessing virtual machine configuration data in order to determine address data as a function of the received VMID, the address data indicating a position of the first memory area in the volatile memory and the second memory area in the volatile memory;

processing the command data stored in the first memory area, thereby generating the response data stored in the second memory area, the processing the command data comprising:

sending, via the master interface circuit of the HSM, read requests to the first communication system in order to read the command data from the first memory area, the read requests comprising the received VMID; and sending, via the master interface circuit of the HSM, the write requests to the first communication system in order to write the response data of the cryptographic service request to the second memory area, the write requests comprising the received VMID; and after processing the command data, storing the response notification to the second register of the second communication channel.

19. The method of claim 17, further comprising, by the slave interface circuit:

receiving the write request from the first communication system;

determining whether the received write request comprises the command notification indicating a request to execute the cryptographic service request; and in response to determining that the received write request comprises the command notification, transmitting the VMID included in the received write request or a further VMID determined as a function of the VMID included in the received write request to the HSM.

20. The method of claim 17, further comprising, by the respective master interface circuit of each microprocessor:

forwarding the read or write requests from the respective microprocessor to the first communication system, the read or write requests comprising a physical address in the physical address range and the VMID stored in the respective first register.

* * * * *